US012521468B1

(12) United States Patent
Chen et al.

(10) Patent No.: US 12,521,468 B1
(45) Date of Patent: Jan. 13, 2026

(54) IMPLANTS FOR CARTILAGE AND RELATED DEVICES AND METHODS

(71) Applicant: BioGend Therapeutics Co., Ltd., Taipei (TW)

(72) Inventors: Chao-Ping Chen, Taipei (TW); Po-Wei Lee, Taipei (TW); Shih-Ting Hsu, Taipei (TW)

(73) Assignee: BioGend Therapeutics Co., Ltd., Taipei (TW)

( * ) Notice: Subject to any disclaimer, the term of this patent is extended or adjusted under 35 U.S.C. 154(b) by 0 days.

(21) Appl. No.: 18/954,292

(22) Filed: Nov. 20, 2024

(51) Int. Cl.
*A61L 27/38* (2006.01)
*A61L 27/12* (2006.01)
*A61L 27/18* (2006.01)
*A61L 27/56* (2006.01)
*A61L 27/58* (2006.01)

(52) U.S. Cl.
CPC ........... *A61L 27/3817* (2013.01); *A61L 27/12* (2013.01); *A61L 27/18* (2013.01); *A61L 27/3852* (2013.01); *A61L 27/56* (2013.01); *A61L 27/58* (2013.01); *A61L 2430/06* (2013.01)

(58) Field of Classification Search
CPC ...... A61L 2430/02; A61L 27/56; A61L 27/12; A61L 2430/06; A61L 27/18; A61L 27/3852; A61L 27/58
See application file for complete search history.

(56) References Cited

U.S. PATENT DOCUMENTS

2006/0178748 A1* 8/2006 Dinger, III ......... A61B 17/1615
623/18.11

OTHER PUBLICATIONS

Tseng et al. "The five year outcome of a clinical feasibility study using a biphasic construct with minced autologous cartilage to repair osteochondral defects in the knee", International Orthopaedics (2020) 44:1745-1754. (Year: 2020).*

* cited by examiner

*Primary Examiner* — Carlos A Azpuru
*Assistant Examiner* — Casey S Hagopian
(74) *Attorney, Agent, or Firm* — PROCOPIO, CORY, HARGREAVES & SAVITCH LLP

(57) ABSTRACT

The present disclosure relates to a transplantable implant comprising a biocompatible scaffold configured to be degraded over time when implanted to cartilage of a patient, the biocompatible scaffold comprising a plurality of pores, and a plurality of chondrocytes incorporated into the scaffold. In some embodiments, the implant has a longitudinal length to be implanted to an implantation hole created on the cartilage, wherein the implantation hole has an implantation depth, wherein the ratio of the full longitudinal length to the thickness of the cartilage is about 3 or less.

26 Claims, 12 Drawing Sheets

IMPLANTS FOR CARTILAGE AND RELATED DEVICES AND METHODS

BACKGROUND

Cartilage is a flexible connective tissue found throughout the body, particularly in joints, where it provides cushioning and allows for smooth movement. Cartilage plays a role in joint health by providing a smooth, low-friction surface that facilitates movement between bones and acts as a shock absorber during physical activities. It can be susceptible to damage from acute injuries, such as sports-related accidents, or gradual wear and tear associated with aging, often leading to conditions like osteoarthritis. Surgical techniques, including cartilage transplantation and autologous chondrocyte implantation, have emerged as options for repairing damaged cartilage, helping to alleviate pain and restore function while delaying the need for more invasive procedures like joint replacement. Cartilage has limited ability to heal due to its lack of blood supply, making damage or wear a medical subject matter. In some examples, cartilage implants can be used. Such implants aim to replace or repair worn-out cartilage at least partially and alleviate joint pain, potentially offering a solution for conditions like osteoarthritis.

SUMMARY

This Summary is provided to introduce a selection of concepts in simplified form that can be further described below in the Detailed Description. This Summary is not intended to identify key aspects or essential aspects of the claimed subject matter.

All features of exemplary embodiments which can be described in this disclosure and can be not mutually exclusive can be combined with one another. Elements of one embodiment can be utilized in the other embodiments without further mention. Other aspects and features of the present invention will become apparent to those ordinarily skilled in the art upon review of the following description of specific embodiments in conjunction with any accompanying Figures.

In some aspects, the techniques described herein relate to a transplantable implant including: a biocompatible scaffold configured to be degraded over time when implanted to cartilage of a patient, the biocompatible scaffold including a plurality of pores; a plurality of chondrocytes incorporated into the scaffold, wherein the implant has a full longitudinal length to be implanted to an implantation hole created on the cartilage, wherein the implantation hole has an implantation depth, wherein the implant along the full longitudinal length has a first longitudinal length corresponding to the cartilage portion in the implantation hole along the implantation depth and optionally a second longitudinal length corresponding to a mineral bone portion in the implantation hole along the implantation depth when the implant is implanted to the implantation hole, wherein the ratio of the first longitudinal length to the full longitudinal length is at least about 0.3.

In some aspects, the techniques described herein relate to a transplantable implant, wherein the ratio of the first longitudinal length to the full longitudinal length is at least about 0.5. In some aspects, the techniques described herein relate to a transplantable implant, wherein the ratio of the first longitudinal length to the full longitudinal length is at least about 0.6. In some aspects, the techniques described herein relate to a transplantable implant, wherein the ratio of the first longitudinal length to the full longitudinal length is up to about 0.8.

In some aspects, the techniques described herein relate to a transplantable implant, wherein the ratio of the first longitudinal length to the full longitudinal length is from about 0.3 to about 1. In some aspects, the techniques described herein relate to a transplantable implant, wherein the ratio of the first longitudinal length to the full longitudinal length is from about 0.35 to about 0.9. In some aspects, the techniques described herein relate to a transplantable implant, wherein the ratio of the first longitudinal length to the full longitudinal length is from about 0.4 to about 0.8. In some aspects, the techniques described herein relate to a transplantable implant, wherein the ratio of the first longitudinal length to the full longitudinal length is from about 0.42 to about 0.8. In some aspects, the techniques described herein relate to a transplantable implant, wherein the ratio of the first longitudinal length to the full longitudinal length is from about 0.45 to about 0.8.

In some aspects, the techniques described herein relate to a transplantable implant, wherein the ratio of the first longitudinal length to the full longitudinal length is from about 0.45 to about 0.7. In some aspects, the techniques described herein relate to a transplantable implant, wherein the ratio of the first longitudinal length to the full longitudinal length is from about 0.5 to about 0.7.

In some aspects, the techniques described herein relate to a transplantable implant, wherein the implant has a full longitudinal length to be implanted to an implantation hole created on the cartilage, wherein the full longitudinal length is about 12 mm or less. In some aspects, the techniques described herein relate to a transplantable implant, wherein the implant has a full longitudinal length to be implanted to an implantation hole created on the cartilage, wherein the full longitudinal length is about 11 mm or less. In some aspects, the techniques described herein relate to a transplantable implant, wherein the implant has a full longitudinal length to be implanted to an implantation hole created on the cartilage, wherein the full longitudinal length is about 10 mm or less. In some aspects, the techniques described herein relate to a transplantable implant, wherein the implant has a full longitudinal length to be implanted to an implantation hole created on the cartilage, wherein the full longitudinal length is about 9 mm or less. In some aspects, the techniques described herein relate to a transplantable implant, wherein the full longitudinal length is about 8.5 mm or less. In some aspects, the techniques described herein relate to a transplantable implant, wherein the full longitudinal length is about 8.0 mm or less. In some aspects, the techniques described herein relate to a transplantable implant, wherein the full longitudinal length is about 6.0 mm or less. In some aspects, the techniques described herein relate to a transplantable implant, wherein the full longitudinal length is about 5.5 mm or less. In some aspects, the techniques described herein relate to a transplantable implant, wherein the full longitudinal length is about 5.0 mm or less. In some aspects, the techniques described herein relate to a transplantable implant, wherein the full longitudinal length is about 4.8 mm or less. In some aspects, the techniques described herein relate to a transplantable implant, wherein the full longitudinal length is about 4.7 mm or less. In some aspects, the techniques described herein relate to a transplantable implant, wherein the full longitudinal length is about 4.6 mm or less. In some aspects, the techniques described herein relate to a transplantable implant, wherein the full longitudinal length is about 4.5 mm or less.

In some aspects, the techniques described herein relate to a transplantable implant, wherein the biocompatible scaffold has the full longitudinal length longer than a cartilage thickness of the cartilage.

In some aspects, the techniques described herein relate to a transplantable implant, wherein the biocompatible scaffold has at least about 60% porosity. In some aspects, the techniques described herein relate to a transplantable implant, wherein the biocompatible scaffold has at least about 65% porosity. In some aspects, the techniques described herein relate to a transplantable implant, wherein the biocompatible scaffold has at least about 75% porosity.

In some aspects, the techniques described herein relate to a transplantable implant, wherein an average size of the plurality of pores is from about 100 μm to about 700 μm. In some aspects, the techniques described herein relate to a transplantable implant, wherein an average size of the plurality of pores is from about 225 μm to about 450 μm.

In some aspects, the techniques described herein relate to a transplantable implant, wherein the plurality of chondrocytes includes a plurality of autologous chondrocytes. In some aspects, the techniques described herein relate to a transplantable implant, wherein the biocompatible scaffold includes poly-L-lactic-co-glycolic acid (PLGA). In some aspects, the techniques described herein relate to a transplantable implant, wherein the biocompatible scaffold includes tricalcium phosphate (TCP).

DETAILED DESCRIPTION

Figure 1A:
FIG. 1A shows implant surgery site with osteochondral defect created by drilling on the center of the load-bearing portion of the distal femoral condyle surface in some embodiments.

As used herein, the articles "a," "an," and "any" refer to the grammar of one or more than one (e.g., at least one) item. For example, "an element" means one element or more than one element.

The term "bottom" used to describe the position of the structure disclosed in the content of the author's description and the scope of the patent application does not specifically refer to the bottommost surface or end of the structure, but refers to the bottommost surface or end of the structure, and Adjacent to various positions around the bottommost point, but not covering the area above the horizontal center of the structure; "top", not a single specific surface or end of the topmost structure, refers to the topmost surface or end of the structure. end, and various positions adjacent to the topmost point, but not below the horizontal center of the structure.

As used herein, the terms "inner" and "inner" describing the position of a structure refer to a position close to the center of the structure body, or use a position that is not exposed; the terms "outer" and "outer" refer to a position away from the structure body center position, or use an exposed position.

The term "on" used to describe the position of the structure disclosed in the content of this creation specification (e.g.: on a certain element, on the surface of a certain element) refers to any surface position of the structure, not commonly known as "above" or "above" with a directionality. "above".

The terms "fixed" and "arranged" used to describe the structure combination relationship disclosed in the content of this creation manual generally refer to the fact that a plurality of structures will not be easily separated or dropped after being combined. It can be a fixed connection or a Detachable connection, integrally formed connection, mechanical connection, electrical connection, or direct physical connection, or indirect connection through intermediate media, such as: using threads, tenons, fasteners, nails, adhesives or high Any combination of cycles.

The terms "pivot" or "pivot" used to describe the structure combination disclosed in the content of this creation manual refer to the combination of hinges, cylinders, spheres, holes and slots, or multiple structures. The bearings can be assembled with each other, so that the multiple structures can still rotate or slide within a limited range at will without being easily separated or dropped.

The term "formation" used to describe the structure combination disclosed in the content of this creation specification generally refers to one structure or multiple structures combined into the same body during manufacture, or the same body due to different positions, shapes and the corresponding structure produced by the function.

When degenerative disease occurs in knee joint, it can lead to a defect in the articular cartilage, affecting the range of motion and stiffness of the patients' knee. A full-thickness defect would lead to knee joint discomfort, swelling, pain, and aching that affect patients' daily activities. According to reports, degenerative knee disease occurs in about 29.1% of men and about 41.5% of women, and it is estimated that over 500 million people are affected worldwide. The risk factors of the knee joint degeneration include age, gender, obesity, genetics, and joint injury or overuse. The main functions of articular cartilage are mechanical support and physical protection. They support pressure from another bone and release it through their elastic and expandable properties. They also protect the bone under the cartilage from another bone and provide a lubricating effect which can make bone slide and joint move smoothly. However, because cartilage is an avascular and lack of repair cell area, they possess limited intrinsic healing capacity. Consequently, mosaicplasty and autologous chondrocyte implantation (ACI) are developed and become mainstream cell-based treatment methods for the knee cartilage repair.

Cartilage can have limited ability to heal due to its lack of blood supply, making damage or wear a medical subject matter. In some embodiments, cartilage implants can be used. Such implants aim to replace or repair worn-out cartilage at least partially and alleviate joint pain, potentially offering a solution for conditions like osteoarthritis. In some embodiments, integration of implants with surrounding tissue is crucial for their success, involving complex biological processes similar to those seen in bone implant integration.

For example, articular cartilage formed on the articular extremities, or surface of bones is a multi-functional tissue and due to elastic property, can break the force of concussions, lubricate the surface of bones with low friction coefficient, and enable perfect ease and freedom of movement between the bones. Cartilage cells, chondrocytes, are about 2% by weight of the articular cartilage and covered with plenty of extracellular matrices. The major difference of articular cartilage to other tissues is that it does not contain blood-vessels, lymphatic vessels, or nerves. Cartilage metabolism is relatively slow in comparison with other tissues; hence, it is much more difficult for defects in cartilage to heal spontaneously. Patients with articular cartilage defects may not feel pain since no nerve is distributed in the articular cartilage. Chondrocytes covered by cell matrices are well-differentiated cells and have low division ability. In addition, mesenchymal stem cells will not be evoked and migrated to the injured area since cartilage lacks blood vessels and lymphatic vessels.

In some embodiments, articular cartilage defects can be classified into partial thickness defect and full thickness defect according to their severity. Partial-thickness defect is a lesion or erosion on the cartilage tissue of the articular surface that does not reach the subchondral bone whereas full-thickness defect penetrates the subchondral bone. In some embodiments, partial thickness defects may be treated, or its symptoms may be relieved by surgery or arthroscopic methods such as abrasion arthroplasty, debridement and lavage, high tibial osteotomy, however, these surgeries may not effectively treat severe damage such as full thickness defects. As a result, patients are faced with the choice of undergoing both joint excision and replacement with an artificial joint to relieve the pain and regain joint function. In the United States, it is estimated that over 150,000 knee replacement operations caused by full thickness defects annually and the number of such operations is increasing year by year. Artificial joints are expensive as is replacement operation. In addition, artificial joints made of metal only have a ten-to twenty-year lifespan. For young patients, a second replacement operation is inevitable, however, older patients may not be able to receive a second replacement operation and become disabled at the rest of their life. In some embodiments, development of a new treatment for full thickness defects of cartilage can be aimed.

In some embodiments, methods available to treat cartilage full thickness defects include micro fracturing and drilling. This technology is a marrow stimulating arthroscopic procedure to penetrate the subchondral bone to induce fibrin clot formation and the migration of primitive stem cells from the bone marrow into the defective cartilage location. More particularly, the base of the defective area is shaved or scraped to induce bleeding. An arthroscopic awl or pick is then used to make small holes or microfractures in the subchondral bone plate. The end of the awl is manually struck with a mallet to form the holes while care is made not to penetrate too deeply and damage the subchondral plate. The holes penetrate a vascularization zone and stimulate the formation of a fibrin clot containing pluripotential stem cells. The clot fills the defect and matures into fibrocartilage. Micro fracturing the subchondral bone plate can be a successful procedure for producing fibrocartilaginous tissue and repairing defective articular cartilage, however, it still has some disadvantages. For example, the microfractures or holes are manually created. If the holes are not deep enough, then the formation of the fibrin clot may not occur. On the other hand, if the holes are too deep, the subchondral bone plate can be damaged and lead to unwanted consequences and complications. In addition, the fibrocartilage formation may fill the defects, but the cartilage function cannot be totally restored. Another technology is Mosaic Plasty procedure developed by a Hungarian surgeon in 1995. This technique involves using a series of dowel cutting instruments to harvest a plug of articular cartilage and subchondral bone from a donor site, which can then be implanted into a core made into the defect site. By repeating this process, transferring a series of plugs, and by placing them in close proximity to one another, in mosaic-like fashion, a new grafted hyaline cartilage surface can be established. The result is a hyaline-like surface interposed with a fibrocartilage healing response between each graft. The advantages of this technique include the grafts are the patient's own tissue and allograft or xenograft rejection can be prevented. In addition, the grafts are biphasic joint containing cartilage and bone and can be implanted to the articular surface to provide excellent support while the surrounding bone tissue grows into the bone portion of the grafts. This procedure, however, is technically difficult. In addition, the grafts are obtained from the unstressed area of the patient, which is limited to a restrained area. The grafting may also destroy the integrity of the joint.

In some embodiments, mosaicplasty may be a regenerated method that can repair tissue defects by their own tissue, which may harvest healthy cartilage tissue blocks from non-weight bearing parts and then implant into recipient sites directly. In some embodiments, this procedure can transplant many times, which may be dependent on the area of the injured part, so the area of the donor site can be proportional to that of the recipient site. In some embodiments, if patients have larger defects, they may need to resect more normal tissue from the donor sites, which could result in less mechanical strength in the donor site. In some embodiments, the cartilage tissue may be directly transplanted from the donor site without any treatment, and the cartilage extracellular matrix (ECM) can be rich in density. In some embodiments, the chondrocytes of implanted cartilage may be less likely to migrate out, potentially resulting in a weaker implant-defect connection and poor subchondral bone repair. Therefore, in some embodiments, the transplanted tissue may easily fall off after surgery.

The present disclosure relates to a transplantable implant including: a biocompatible scaffold configured to be degraded over time when implanted to cartilage of a patient, the biocompatible scaffold including a plurality of pores; a plurality of chondrocytes incorporated into the scaffold, wherein, about 12 months after the implant is implanted to the cartilage, the implant results in a recovery state of the cartilage exhibiting from about 0.20 to about 0.30 strain in response to about 10 MPa or more of stress. In some embodiments, about 12 months after the implant is implanted to the cartilage, the implant results in the recovery state of the cartilage exhibiting from about 0.20 to about 0.30 strain in response to about 12 MPa or more of stress. In some embodiments, about 12 months after the implant is implanted to the cartilage, the implant results in the recovery state of the cartilage exhibiting from about 0.20 to about 0.30 strain in response to about 13 MPa or more of stress.

In some embodiments, about 12 months after the implant is implanted to the cartilage, the implant results in the recovery state of the cartilage exhibiting from about 0.20 to about 0.30 strain in response to about 14.0 MPa or more of stress. In some embodiments, about 12 months after the implant is implanted to the cartilage, the implant results in the recovery state of the cartilage exhibiting from about 0.20 to about 0.30 strain in response to about 14.5 MPa or more of stress. In some embodiments, about 12 months after the implant is implanted to the cartilage, the implant results in the recovery state of the cartilage exhibiting from about 0.20 to about 0.30 strain in response to about 14.8 MPa or more of stress. In some embodiments, about 12 months after the implant is implanted to the cartilage, the implant results in the recovery state of the cartilage exhibiting from about 0.20 to about 0.30 strain in response to about 14.9 MPa or more of stress.

In some embodiments, about 12 months after the implant is implanted to the cartilage, the implant results in the recovery state of the cartilage exhibiting from about 0.20 to about 0.30 strain in response to about 15.0 MPa or more of stress. In some embodiments, about 12 months after the implant is implanted to the cartilage, the implant results in the recovery state of the cartilage exhibiting from about 0.20 to about 0.30 strain in response to about 15.2 MPa or more of stress. In some embodiments, about 12 months after the implant is implanted to the cartilage, the implant results in the recovery state of the cartilage exhibiting from about 0.20 to about 0.30 strain in response to about 15.5 MPa or more of stress.

In some embodiments, about 12 months after the implant is implanted to the cartilage, the implant results in the recovery state of the cartilage exhibiting from about 0.20 to about 0.30 strain in response to about 16.0 MPa or more of stress. In some embodiments, about 12 months after the implant is implanted to the cartilage, the implant results in the recovery state of the cartilage exhibiting from about 0.20 to about 0.30 strain in response to about 16.1 MPa or more of stress. In some embodiments, about 12 months after the implant is implanted to the cartilage, the implant results in the recovery state of the cartilage exhibiting from about 0.20 to about 0.30 strain in response to about 16.2 MPa or more of stress. In some embodiments, about 12 months after the implant is implanted to the cartilage, the implant results in the recovery state of the cartilage exhibiting from about 0.20 to about 0.30 strain in response to about 16.3 MPa or more of stress. In some embodiments, about 12 months after the implant is implanted to the cartilage, the implant results in the recovery state of the cartilage exhibiting from about 0.20 to about 0.30 strain in response to about 16.4 MPa or more of stress.

In some embodiments, about 12 months after the implant is implanted to the cartilage, the implant results in the recovery state of the cartilage exhibiting from about 0.20 to about 0.30 strain in response to about 16.5 MPa or more of stress. In some embodiments, about 12 months after the implant is implanted to the cartilage, the implant results in the recovery state of the cartilage exhibiting from about 0.20 to about 0.30 strain in response to about 16.6 MPa or more of stress. In some embodiments, about 12 months after the implant is implanted to the cartilage, the implant results in the recovery state of the cartilage exhibiting from about 0.20 to about 0.30 strain in response to about 16.7 MPa or more of stress. In some embodiments, about 12 months after the implant is implanted to the cartilage, the implant results in the recovery state of the cartilage exhibiting from about 0.20 to about 0.30 strain in response to about 16.8 MPa or more of stress. In some embodiments, about 12 months after the implant is implanted to the cartilage, the implant results in the recovery state of the cartilage exhibiting from about 0.20 to about 0.30 strain in response to about 16.9 MPa or more of stress.

In some embodiments, about 12 months after the implant is implanted to the cartilage, the implant results in the recovery state of the cartilage exhibiting from about 0.20 to about 0.30 strain in response to about 17.0 MPa or more of stress. In some embodiments, about 12 months after the implant is implanted to the cartilage, the implant results in the recovery state of the cartilage exhibiting from about 0.20 to about 0.30 strain in response to about 17.5 MPa or more of stress. In some embodiments, about 12 months after the implant is implanted to the cartilage, the implant results in the recovery state of the cartilage exhibiting from about 0.20 to about 0.30 strain in response to about 18.0 MPa or more of stress. In some embodiments, about 12 months after the implant is implanted to the cartilage, the implant results in the recovery state of the cartilage exhibiting from about 0.20 to about 0.30 strain in response to about 19.0 MPa or more of stress. In some embodiments, about 12 months after the implant is implanted to the cartilage, the implant results in the recovery state of the cartilage exhibiting from about 0.20 to about 0.30 strain in response to about 19.5 MPa or more of stress. In some embodiments, about 12 months after the implant is implanted to the cartilage, the implant results in the recovery state of the cartilage exhibiting from about 0.20 to about 0.30 strain in response to about 19.7 MPa or more of stress. In some embodiments, about 12 months after the implant is implanted to the cartilage, the implant results in the recovery state of the cartilage exhibiting from about 0.20 to about 0.30 strain in response to about 20.0 MPa or more of stress. In some embodiments, about 12 months after the implant is implanted to the cartilage, the implant results in the recovery state of the cartilage exhibiting from about 0.20 to about 0.30 strain in response to about 20.2 MPa or more of stress. In some embodiments, about 12 months after the implant is implanted to the cartilage, the implant results in the recovery state of the cartilage exhibiting from about 0.20 to about 0.30 strain in response to about 20.5 MPa or more of stress. In some embodiments, about 12 months after the implant is implanted to the cartilage, the implant results in the recovery state of the cartilage exhibiting from about 0.20 to about 0.30 strain in response to about 21.0 MPa or more of stress. In some embodiments, about 12 months after the implant is implanted to the cartilage, the implant results in the recovery state of the cartilage exhibiting from about 0.20 to about 0.30 strain in response to about 22.0 MPa or more of stress. In some embodiments, about 12 months after the implant is implanted to the cartilage, the implant results in the recovery state of the cartilage exhibiting from about 0.20 to about 0.30 strain in response to about 23.0 MPa or more of stress. In some embodiments, about 12 months after the implant is implanted to the cartilage, the implant results in the recovery state of the cartilage exhibiting from about 0.20 to about 0.30 strain in response to about 25.0 MPa or more of stress.

In some embodiments, about 12 months after the implant is implanted to the cartilage, the implant results in the recovery state of the cartilage exhibiting from about 0.20 to about 0.30 strain in response to about 23.0 MPa or more of stress. In some embodiments, about 12 months after the implant is implanted to the cartilage, the implant results in the recovery state of the cartilage exhibiting from about 0.20 to about 0.30 strain in response to about 25.0 MPa or more of stress. In some embodiments, about 12 months after the implant is implanted to the cartilage, the implant results in the recovery state of the cartilage exhibiting from about 0.20 to about 0.30 strain in response to from about 14.0 MPa to about 25.0 MPa of stress.

In some embodiments, about 12 months after the implant is implanted to the cartilage, the implant results in the recovery state of the cartilage exhibiting from about 0.20 to about 0.30 strain in response to from about 14.8 MPa to about 24.0 MPa of stress. In some embodiments, about 12 months after the implant is implanted to the cartilage, the implant results in the recovery state of the cartilage exhibiting from about 0.20 to about 0.30 strain in response to from about 15.0 MPa to about 23.0 MPa of stress. In some embodiments, about 12 months after the implant is implanted to the cartilage, the implant results in the recovery state of the cartilage exhibiting from about 0.20 to about 0.30 strain in response to from about 15.5 MPa to about 22.0 MPa of stress. In some embodiments, about 12 months after the implant is implanted to the cartilage, the implant results in the recovery state of the cartilage exhibiting from about 0.20 to about 0.30 strain in response to from about 16.0 MPa to about 21.0 MPa of stress. In some embodiments, about 12 months after the implant is implanted to the cartilage, the implant results in the recovery state of the cartilage exhibiting from about 0.20 to about 0.30 strain in response to from about 16.5 MPa to about 20.0 MPa of stress. In some embodiments, about 12 months after the implant is implanted to the cartilage, the implant results in the recovery state of the cartilage exhibiting from about 0.20 to about 0.30 strain in response to from about 16.7 MPa to about 20.0 MPa of stress. In some embodiments, about 12 months after the implant is implanted to the cartilage, the implant results in the recovery state of the cartilage exhibiting from about 0.20 to about 0.30 strain in response to from about 16.3 MPa to about 25.0 MPa of stress.

The present disclosure relates to a transplantable implant including: a biocompatible scaffold configured to be degraded over time when implanted to cartilage of a patient, the biocompatible scaffold including a plurality of pores; a plurality of chondrocytes incorporated into the scaffold, wherein, about 12 months after the implant is implanted to the cartilage, the implant results in a recovery state of the cartilage exhibiting about 6 mm to about 9 mm of displacement upon application of about 6100 N of load force.

In some embodiments, about 12 months after the implant is implanted to the cartilage, the implant results in the recovery state of the cartilage exhibiting about 6 mm to about 9 mm of displacement upon application of about 6150 N of load force. In some embodiments, about 12 months after the implant is implanted to the cartilage, the implant results in the recovery state of the cartilage exhibiting about 6 mm to about 9 mm of displacement upon application of about 6200 N of load force. In some embodiments, about 12 months after the implant is implanted to the cartilage, the implant results in the recovery state of the cartilage exhibiting about 6 mm to about 9 mm of displacement upon application of about 6300 N of load force. In some embodiments, about 12 months after the implant is implanted to the cartilage, the implant results in the recovery state of the cartilage exhibiting about 6 mm to about 9 mm of displacement upon application of about 6400 N of load force. In some embodiments, about 12 months after the implant is implanted to the cartilage, the implant results in the recovery state of the cartilage exhibiting about 6 mm to about 9 mm of displacement upon application of about 6450 N of load force. In some embodiments, about 12 months after the implant is implanted to the cartilage, the implant results in the recovery state of the cartilage exhibiting about 6 mm to about 9 mm of displacement upon application of about 6500 N of load force. In some embodiments, about 12 months after the implant is implanted to the cartilage, the implant results in the recovery state of the cartilage exhibiting about 6 mm to about 9 mm of displacement upon application of about 6550 N of load force. In some embodiments, about 12 months after the implant is implanted to the cartilage, the implant results in the recovery state of the cartilage exhibiting about 6 mm to about 9 mm of displacement upon application of about 7000 N of load force. In some embodiments, about 12 months after the implant is implanted to the cartilage, the implant results in the recovery state of the cartilage exhibiting about 6 mm to about 9 mm of displacement upon application of about 7300 N of load force.

In some embodiments, about 12 months after the implant is implanted to the cartilage, the implant results in the recovery state of the cartilage exhibiting about 6 mm to about 9 mm of displacement upon application of about 7500 N of load force. In some embodiments, about 12 months after the implant is implanted to the cartilage, the implant results in the recovery state of the cartilage exhibiting about 6 mm to about 9 mm of displacement upon application of about 7700 N of load force. In some embodiments, about 12 months after the implant is implanted to the cartilage, the implant results in the recovery state of the cartilage exhibiting about 6 mm to about 9 mm of displacement upon application of about 8000 N of load force. In some embodiments, about 12 months after the implant is implanted to the cartilage, the implant results in the recovery state of the cartilage exhibiting about 6 mm to about 9 mm of displacement upon application of about 8300 N of load force. In some embodiments, about 12 months after the implant is implanted to the cartilage, the implant results in the recovery state of the cartilage exhibiting about 6 mm to about 9 mm of displacement upon application of about 8400 N of load force.

In some embodiments, about 12 months after the implant is implanted to the cartilage, the implant results in the recovery state of the cartilage exhibiting about 6 mm to about 9 mm of displacement upon application of about 8500 N of load force. In some embodiments, about 12 months after the implant is implanted to the cartilage, the implant results in the recovery state of the cartilage exhibiting about 6 mm to about 9 mm of displacement upon application of about 8700 N of load force. In some embodiments, about 12 months after the implant is implanted to the cartilage, the implant results in the recovery state of the cartilage exhibiting about 6 mm to about 9 mm of displacement upon application of about 9000 N of load force.

The present disclosure relates to a transplantable implant including: a biocompatible scaffold configured to be degraded over time when implanted to cartilage of a patient, the biocompatible scaffold including a plurality of pores; a plurality of chondrocytes incorporated into the scaffold, wherein, about 12 months after the implant is implanted to the cartilage, the implant results in a recovery state of the cartilage exhibiting: from about 0.20 to about 0.30 strain in response to about 10 MPa or more of stress, and about 6 mm to about 9 mm of displacement upon application of about 6100 N of load force.

In some embodiments, about 12 months after the implant is implanted to the cartilage, the implant results in the recovery state of the cartilage exhibiting from about 0.20 to about 0.30 strain in response to about 12 MPa or more of stress. In some embodiments, about 12 months after the implant is implanted to the cartilage, the implant results in the recovery state of the cartilage exhibiting from about 0.20 to about 0.30 strain in response to about 13 MPa or more of stress.

In some embodiments, about 12 months after the implant is implanted to the cartilage, the implant results in the recovery state of the cartilage exhibiting from about 0.20 to about 0.30 strain in response to about 14.0 MPa or more of stress. In some embodiments, about 12 months after the implant is implanted to the cartilage, the implant results in the recovery state of the cartilage exhibiting from about 0.20 to about 0.30 strain in response to about 14.5 MPa or more of stress. In some embodiments, about 12 months after the implant is implanted to the cartilage, the implant results in the recovery state of the cartilage exhibiting from about 0.20 to about 0.30 strain in response to about 14.8 MPa or more of stress. In some embodiments, about 12 months after the implant is implanted to the cartilage, the implant results in the recovery state of the cartilage exhibiting from about 0.20 to about 0.30 strain in response to about 14.9 MPa or more of stress.

In some embodiments, about 12 months after the implant is implanted to the cartilage, the implant results in the recovery state of the cartilage exhibiting from about 0.20 to about 0.30 strain in response to about 15.0 MPa or more of stress. In some embodiments, about 12 months after the implant is implanted to the cartilage, the implant results in the recovery state of the cartilage exhibiting from about 0.20 to about 0.30 strain in response to about 15.2 MPa or more of stress. In some embodiments, about 12 months after the implant is implanted to the cartilage, the implant results in the recovery state of the cartilage exhibiting from about 0.20 to about 0.30 strain in response to about 15.5 MPa or more of stress.

In some embodiments, about 12 months after the implant is implanted to the cartilage, the implant results in the recovery state of the cartilage exhibiting from about 0.20 to about 0.30 strain in response to about 16.0 MPa or more of stress. In some embodiments, about 12 months after the implant is implanted to the cartilage, the implant results in the recovery state of the cartilage exhibiting from about 0.20 to about 0.30 strain in response to about 16.1 MPa or more of stress. In some embodiments, about 12 months after the implant is implanted to the cartilage, the implant results in the recovery state of the cartilage exhibiting from about 0.20 to about 0.30 strain in response to about 16.2 MPa or more of stress. In some embodiments, about 12 months after the implant is implanted to the cartilage, the implant results in the recovery state of the cartilage exhibiting from about 0.20 to about 0.30 strain in response to about 16.3 MPa or more of stress. In some embodiments, about 12 months after the implant is implanted to the cartilage, the implant results in the recovery state of the cartilage exhibiting from about 0.20 to about 0.30 strain in response to about 16.4 MPa or more of stress.

In some embodiments, about 12 months after the implant is implanted to the cartilage, the implant results in the recovery state of the cartilage exhibiting from about 0.20 to about 0.30 strain in response to about 16.5 MPa or more of stress. In some embodiments, about 12 months after the implant is implanted to the cartilage, the implant results in the recovery state of the cartilage exhibiting from about 0.20 to about 0.30 strain in response to about 16.6 MPa or more of stress. In some embodiments, about 12 months after the implant is implanted to the cartilage, the implant results in the recovery state of the cartilage exhibiting from about 0.20 to about 0.30 strain in response to about 16.7 MPa or more of stress. In some embodiments, about 12 months after the implant is implanted to the cartilage, the implant results in the recovery state of the cartilage exhibiting from about 0.20 to about 0.30 strain in response to about 16.8 MPa or more of stress. In some embodiments, about 12 months after the implant is implanted to the cartilage, the implant results in the recovery state of the cartilage exhibiting from about 0.20 to about 0.30 strain in response to about 16.9 MPa or more of stress.

In some embodiments, about 12 months after the implant is implanted to the cartilage, the implant results in the recovery state of the cartilage exhibiting from about 0.20 to about 0.30 strain in response to about 17.0 MPa or more of stress. In some embodiments, about 12 months after the implant is implanted to the cartilage, the implant results in the recovery state of the cartilage exhibiting from about 0.20 to about 0.30 strain in response to about 17.5 MPa or more of stress. In some embodiments, about 12 months after the implant is implanted to the cartilage, the implant results in the recovery state of the cartilage exhibiting from about 0.20 to about 0.30 strain in response to about 18.0 MPa or more of stress.

In some embodiments, about 12 months after the implant is implanted to the cartilage, the implant results in the recovery state of the cartilage exhibiting from about 0.20 to about 0.30 strain in response to about 19.0 MPa or more of stress. In some embodiments, about 12 months after the implant is implanted to the cartilage, the implant results in the recovery state of the cartilage exhibiting from about 0.20 to about 0.30 strain in response to about 19.5 MPa or more of stress. In some embodiments, about 12 months after the implant is implanted to the cartilage, the implant results in the recovery state of the cartilage exhibiting from about 0.20 to about 0.30 strain in response to about 19.7 MPa or more of stress.

In some embodiments, about 12 months after the implant is implanted to the cartilage, the implant results in the recovery state of the cartilage exhibiting from about 0.20 to about 0.30 strain in response to about 20.0 MPa or more of stress. In some embodiments, about 12 months after the implant is implanted to the cartilage, the implant results in the recovery state of the cartilage exhibiting from about 0.20 to about 0.30 strain in response to about 20.2 MPa or more of stress. In some embodiments, about 12 months after the implant is implanted to the cartilage, the implant results in the recovery state of the cartilage exhibiting from about 0.20 to about 0.30 strain in response to about 20.5 MPa or more of stress. In some embodiments, about 12 months after the implant is implanted to the cartilage, the implant results in the recovery state of the cartilage exhibiting from about 0.20 to about 0.30 strain in response to about 21.0 MPa or more of stress. In some embodiments, about 12 months after the implant is implanted to the cartilage, the implant results in the recovery state of the cartilage exhibiting from about 0.20 to about 0.30 strain in response to about 22.0 MPa or more of stress. In some embodiments, about 12 months after the implant is implanted to the cartilage, the implant results in the recovery state of the cartilage exhibiting from about 0.20 to about 0.30 strain in response to about 23.0 MPa or more of stress. In some embodiments, about 12 months after the implant is implanted to the cartilage, the implant results in the recovery state of the cartilage exhibiting from about 0.20 to about 0.30 strain in response to about 25.0 MPa or more of stress.

In some embodiments, about 12 months after the implant is implanted to the cartilage, the implant results in the recovery state of the cartilage exhibiting from about 0.20 to about 0.30 strain in response to about 23.0 MPa or more of stress. In some embodiments, about 12 months after the implant is implanted to the cartilage, the implant results in the recovery state of the cartilage exhibiting from about 0.20 to about 0.30 strain in response to about 25.0 MPa or more of stress. In some embodiments, about 12 months after the implant is implanted to the cartilage, the implant results in the recovery state of the cartilage exhibiting from about 0.20 to about 0.30 strain in response to from about 14.0 MPa to about 25.0 MPa of stress.

In some embodiments, about 12 months after the implant is implanted to the cartilage, the implant results in the recovery state of the cartilage exhibiting from about 0.20 to about 0.30 strain in response to from about 14.8 MPa to about 24.0 MPa of stress. In some embodiments, about 12 months after the implant is implanted to the cartilage, the implant results in the recovery state of the cartilage exhibiting from about 0.20 to about 0.30 strain in response to from about 15.0 MPa to about 23.0 MPa of stress. In some embodiments, about 12 months after the implant is implanted to the cartilage, the implant results in the recovery state of the cartilage exhibiting from about 0.20 to about 0.30 strain in response to from about 15.5 MPa to about 22.0 MPa of stress. In some embodiments, about 12 months after the implant is implanted to the cartilage, the implant results in the recovery state of the cartilage exhibiting from about 0.20 to about 0.30 strain in response to from about 16.0 MPa to about 21.0 MPa of stress. In some embodiments, about 12 months after the implant is implanted to the cartilage, the implant results in the recovery state of the cartilage exhibiting from about 0.20 to about 0.30 strain in response to from about 16.5 MPa to about 20.0 MPa of stress. In some embodiments, about 12 months after the implant is implanted to the cartilage, the implant results in the recovery state of the cartilage exhibiting from about 0.20 to about 0.30 strain in response to from about 16.7 MPa to about 20.0 MPa of stress. In some embodiments, about 12 months after the implant is implanted to the cartilage, the implant results in the recovery state of the cartilage exhibiting from about 0.20 to about 0.30 strain in response to from about 16.3 MPa to about 25.0 MPa of stress.

In some embodiments, about 12 months after the implant is implanted to the cartilage, the implant results in the recovery state of the cartilage exhibiting about 6 mm to about 9 mm of displacement upon application of about 6150 N of load force. In some embodiments, about 12 months after the implant is implanted to the cartilage, the implant results in the recovery state of the cartilage exhibiting about 6 mm to about 9 mm of displacement upon application of about 6200 N of load force. In some embodiments, about 12 months after the implant is implanted to the cartilage, the implant results in the recovery state of the cartilage exhibiting about 6 mm to about 9 mm of displacement upon application of about 6300 N of load force. In some embodiments, about 12 months after the implant is implanted to the cartilage, the implant results in the recovery state of the cartilage exhibiting about 6 mm to about 9 mm of displacement upon application of about 6400 N of load force. In some embodiments, about 12 months after the implant is implanted to the cartilage, the implant results in the recovery state of the cartilage exhibiting about 6 mm to about 9 mm of displacement upon application of about 6450 N of load force. In some embodiments, about 12 months after the implant is implanted to the cartilage, the implant results in the recovery state of the cartilage exhibiting about 6 mm to about 9 mm of displacement upon application of about 6500 N of load force. In some embodiments, about 12 months after the implant is implanted to the cartilage, the implant results in the recovery state of the cartilage exhibiting about 6 mm to about 9 mm of displacement upon application of about 6550 N of load force. In some embodiments, about 12 months after the implant is implanted to the cartilage, the implant results in the recovery state of the cartilage exhibiting about 6 mm to about 9 mm of displacement upon application of about 7000 N of load force. In some embodiments, about 12 months after the implant is implanted to the cartilage, the implant results in the recovery state of the cartilage exhibiting about 6 mm to about 9 mm of displacement upon application of about 7300 N of load force.

In some embodiments, about 12 months after the implant is implanted to the cartilage, the implant results in the recovery state of the cartilage exhibiting about 6 mm to about 9 mm of displacement upon application of about 7500 N of load force. In some embodiments, about 12 months after the implant is implanted to the cartilage, the implant results in the recovery state of the cartilage exhibiting about 6 mm to about 9 mm of displacement upon application of about 7700 N of load force. In some embodiments, about 12 months after the implant is implanted to the cartilage, the implant results in the recovery state of the cartilage exhibiting about 6 mm to about 9 mm of displacement upon application of about 8000 N of load force. In some embodiments, about 12 months after the implant is implanted to the cartilage, the implant results in the recovery state of the cartilage exhibiting about 6 mm to about 9 mm of displacement upon application of about 8300 N of load force. In some embodiments, about 12 months after the implant is implanted to the cartilage, the implant results in the recovery state of the cartilage exhibiting about 6 mm to about 9 mm of displacement upon application of about 8400 N of load force.

In some embodiments, about 12 months after the implant is implanted to the cartilage, the implant results in the recovery state of the cartilage exhibiting about 6 mm to about 9 mm of displacement upon application of about 8500 N of load force. In some embodiments, about 12 months after the implant is implanted to the cartilage, the implant results in the recovery state of the cartilage exhibiting about 6 mm to about 9 mm of displacement upon application of about 8700 N of load force. In some embodiments, about 12 months after the implant is implanted to the cartilage, the implant results in the recovery state of the cartilage exhibiting about 6 mm to about 9 mm of displacement upon application of about 9000 N of load force.

In some embodiments, the implant has a full longitudinal length and to be implanted to an implantation hole created on the cartilage, wherein the implantation hole has an implantation depth, wherein the implant along the full longitudinal length has a first longitudinal length corresponding to the cartilage portion in the implantation hole along the implantation depth and optionally a second longitudinal length corresponding to a mineral bone portion in the implantation hole along the implantation depth when the implant is implanted to the implantation hole, wherein the ratio of the first longitudinal length to the full longitudinal length is at least about 0.3.

In some embodiments, the implant has a full longitudinal length to be implanted to an implantation hole created on the cartilage, wherein the full longitudinal length is about 10 mm or less, wherein the implant along the full longitudinal length has a first longitudinal length corresponding to the cartilage portion in the implantation hole along the implantation depth and optionally a second longitudinal length corresponding to a mineral bone portion in the implantation hole along the implantation depth when the implant is implanted to the implantation hole.

In some embodiments, the full longitudinal length is about 10 mm or less. In some embodiments, the ratio of the first longitudinal length to the full longitudinal length is at least about 0.33. In some embodiments, the ratio of the first longitudinal length to the full longitudinal length is at least about 0.35. In some embodiments, the ratio of the first longitudinal length to the full longitudinal length is at least about 0.4. In some embodiments, the ratio of the first longitudinal length to the full longitudinal length is at least about 0.5. In some embodiments, the ratio of the first longitudinal length to the full longitudinal length is at least about 0.55. In some embodiments, the ratio of the first longitudinal length to the full longitudinal length is at least about 0.6. In some embodiments, the ratio of the first longitudinal length to the full longitudinal length is at least about 0.62. In some embodiments, the ratio of the first longitudinal length to the full longitudinal length is at least about 0.64. In some embodiments, the ratio of the first longitudinal length to the full longitudinal length is at least about 0.65. In some embodiments, the ratio of the first longitudinal length to the full longitudinal length is at least about 0.66. In some embodiments, the ratio of the first longitudinal length to the full longitudinal length is at least about 0.67. In some embodiments, the ratio of the first longitudinal length to the full longitudinal length is at least about 0.68. In some embodiments, the ratio of the first longitudinal length to the full longitudinal length is at least about 0.69. In some embodiments, the ratio of the first longitudinal length to the full longitudinal length is at least about 0.7. In some embodiments, the ratio of the first longitudinal length to the full longitudinal length is at least about 0.8. In some embodiments, the ratio of the first longitudinal length to the full longitudinal length is at least about 0.9. In some embodiments, the ratio of the first longitudinal length to the full longitudinal length is at least about 1.

In some embodiments, the ratio of the first longitudinal length to the full longitudinal length is up to about 1. In some embodiments, the ratio of the first longitudinal length to the full longitudinal length is up to about 0.9. In some embodiments, the ratio of the first longitudinal length to the full longitudinal length is up to about 0.8. In some embodiments, the ratio of the first longitudinal length to the full longitudinal length is up to about 0.7. In some embodiments, the ratio of the first longitudinal length to the full longitudinal length is up to about 0.68.

In some embodiments, the ratio of the first longitudinal length to the full longitudinal length is from about 0.3 to about 1. In some embodiments, the ratio of the first longitudinal length to the full longitudinal length is from about 0.33 to about 0.95. In some embodiments, the ratio of the first longitudinal length to the full longitudinal length is from about 0.35 to about 0.9. In some embodiments, the ratio of the first longitudinal length to the full longitudinal length is from about 0.35 to about 0.8. In some embodiments, the ratio of the first longitudinal length to the full longitudinal length is from about 0.37 to about 0.8. In some embodiments, the ratio of the first longitudinal length to the full longitudinal length is from about 0.4 to about 0.8. In some embodiments, the ratio of the first longitudinal length to the full longitudinal length is from about 0.42 to about 0.8. In some embodiments, the ratio of the first longitudinal length to the full longitudinal length is from about 0.45 to about 0.8. In some embodiments, the ratio of the first longitudinal length to the full longitudinal length is from about 0.45 to about 0.7. In some embodiments, the ratio of the first longitudinal length to the full longitudinal length is from about 0.48 to about 0.8. In some embodiments, the ratio of the first longitudinal length to the full longitudinal length is from about 0.5 to about 0.7.

In some embodiments, the implant has a full longitudinal length to be implanted to an implantation hole created on the cartilage, wherein the full longitudinal length is about 12 mm or less. In some embodiments, the implant has a full longitudinal length to be implanted to an implantation hole created on the cartilage, wherein the full longitudinal length is about 11 mm or less. In some embodiments, the implant has a full longitudinal length to be implanted to an implantation hole created on the cartilage, wherein the full longitudinal length is about 10 mm or less. In some embodiments, the full longitudinal length is about 9 mm or less. In some embodiments, the full longitudinal length is about 8.5 mm or less. In some embodiments, the full longitudinal length is about 8.0 mm or less. In some embodiments, the full longitudinal length is about 7.5 mm or less. In some embodiments, the full longitudinal length is about 7.0 mm or less. In some embodiments, the full longitudinal length is about 6.5 mm or less. In some embodiments, the full longitudinal length is about 6.0 mm or less. In some embodiments, the full longitudinal length is about 5.5 mm or less. In some embodiments, the full longitudinal length is about 5.2 mm or less. In some embodiments, the full longitudinal length is about 5.0 mm or less. In some embodiments, the full longitudinal length is about 4.8 mm or less. In some embodiments, the full longitudinal length is about 4.7 mm or less. In some embodiments, the full longitudinal length is about 4.6 mm or less. In some embodiments, the full longitudinal length is about 4.5 mm or less.

The present disclosure relates to a transplantable implant including: a biocompatible scaffold configured to be degraded over time when implanted to cartilage of a patient, the biocompatible scaffold including a plurality of pores; a plurality of chondrocytes incorporated into the scaffold, wherein the implant has a full longitudinal length to be implanted to an implantation hole created on the cartilage, wherein the implantation hole has an implantation depth, wherein the implant along the full longitudinal length has a first longitudinal length corresponding to the cartilage portion in the implantation hole along the implantation depth and optionally a second longitudinal length corresponding to a mineral bone portion in the implantation hole along the implantation depth when the implant is implanted to the implantation hole, wherein the ratio of the first longitudinal length to the full longitudinal length is at least about 0.3.

In some embodiments, the ratio of the first longitudinal length to the full longitudinal length is at least about 0.33. In some embodiments, the ratio of the first longitudinal length to the full longitudinal length is at least about 0.35. In some embodiments, the ratio of the first longitudinal length to the full longitudinal length is at least about 0.4. In some embodiments, the ratio of the first longitudinal length to the full longitudinal length is at least about 0.5. In some embodiments, the ratio of the first longitudinal length to the full longitudinal length is at least about 0.55. In some embodiments, the ratio of the first longitudinal length to the full longitudinal length is at least about 0.6. In some embodiments, the ratio of the first longitudinal length to the full longitudinal length is at least about 0.62. In some embodiments, the ratio of the first longitudinal length to the full longitudinal length is at least about 0.64. In some embodiments, the ratio of the first longitudinal length to the full longitudinal length is at least about 0.65. In some embodiments, the ratio of the first longitudinal length to the full longitudinal length is at least about 0.66. In some embodiments, the ratio of the first longitudinal length to the full longitudinal length is at least about 0.67. In some embodiments, the ratio of the first longitudinal length to the full longitudinal length is at least about 0.68. In some embodiments, the ratio of the first longitudinal length to the full longitudinal length is at least about 0.69. In some embodiments, the ratio of the first longitudinal length to the full longitudinal length is at least about 0.7. In some embodiments, the ratio of the first longitudinal length to the full longitudinal length is at least about 0.8. In some embodiments, the ratio of the first longitudinal length to the full longitudinal length is at least about 0.9. In some embodiments, the ratio of the first longitudinal length to the full longitudinal length is at least about 1.

In some embodiments, the ratio of the first longitudinal length to the full longitudinal length is up to about 1. In some embodiments, the ratio of the first longitudinal length to the full longitudinal length is up to about 0.9. In some embodiments, the ratio of the first longitudinal length to the full longitudinal length is up to about 0.8. In some embodiments, the ratio of the first longitudinal length to the full longitudinal length is up to about 0.7.

In some embodiments, the ratio of the first longitudinal length to the full longitudinal length is from about 0.3 to about 1. In some embodiments, the ratio of the first longitudinal length to the full longitudinal length is from about 0.33 to about 0.95. In some embodiments, the ratio of the first longitudinal length to the full longitudinal length is from about 0.35 to about 0.9. In some embodiments, the ratio of the first longitudinal length to the full longitudinal length is from about 0.35 to about 0.8. In some embodiments, the ratio of the first longitudinal length to the full longitudinal length is from about 0.37 to about 0.8. In some embodiments, the ratio of the first longitudinal length to the full longitudinal length is from about 0.4 to about 0.8. In some embodiments, the ratio of the first longitudinal length to the full longitudinal length is from about 0.42 to about 0.8. In some embodiments, the ratio of the first longitudinal length to the full longitudinal length is from about 0.45 to about 0.8. In some embodiments, the ratio of the first longitudinal length to the full longitudinal length is from about 0.45 to about 0.7. In some embodiments, the ratio of the first longitudinal length to the full longitudinal length is from about 0.48 to about 0.8. In some embodiments, the ratio of the first longitudinal length to the full longitudinal length is from about 0.5 to about 0.7.

The present disclosure relates to a transplantable implant including: a biocompatible scaffold configured to be degraded over time when implanted to cartilage of a patient, the biocompatible scaffold including a plurality of pores; a plurality of chondrocytes incorporated into the scaffold, wherein the implant has a longitudinal length to be implanted to an implantation hole created on the cartilage, wherein the full longitudinal length is about 15 mm or less.

In some embodiments, the full longitudinal length is about 14.5 mm or less. In some embodiments, the full longitudinal length is about 14 mm or less. In some embodiments, the full longitudinal length is about 13 mm or less. In some embodiments, the full longitudinal length is about 12 mm or less. In some embodiments, the full longitudinal length is about 11 mm or less. In some embodiments, the full longitudinal length is about 10.5 mm or less. In some embodiments, the full longitudinal length is about 10 mm or less. In some embodiments, the full longitudinal length is about 9.5 mm or less. In some embodiments, the full longitudinal length is about 9 mm or less. In some embodiments, the full longitudinal length is about 8.5 mm or less. In some embodiments, the full longitudinal length is about 8 mm or less. In some embodiments, the full longitudinal length is about 7.5 mm or less. In some embodiments, the full longitudinal length is about 7.0 mm or less. In some embodiments, the full longitudinal length is about 6.5 mm or less. In some embodiments, the full longitudinal length is about 6.0 mm or less. In some embodiments, the full longitudinal length is about 5.5 mm or less. In some embodiments, the full longitudinal length is about 5.2 mm or less. In some embodiments, the full longitudinal length is about 5.0 mm or less. In some embodiments, the full longitudinal length is about 4.8 mm or less. In some embodiments, the full longitudinal length is about 4.7 mm or less. In some embodiments, the full longitudinal length is about 4.6 mm or less. In some embodiments, the full longitudinal length is about 4.5 mm or less. In some embodiments, the full longitudinal length is about 4.3 mm or less. In some embodiments, the full longitudinal length is about 4.1 mm or less. In some embodiments, the full longitudinal length is about 4.0 mm or less. In some embodiments, the full longitudinal length is about 3.9 mm or less. In some embodiments, the full longitudinal length is about 3.8 mm or less. In some embodiments, the full longitudinal length is about 3.7 mm or less. In some embodiments, the full longitudinal length is about 3.6 mm or less.

In some embodiments, the biocompatible scaffold has the full longitudinal length longer than a cartilage thickness of the cartilage. In some embodiments, the biocompatible scaffold has the full longitudinal length about equal to or similar to the implantation depth. In some embodiments, when the biocompatible scaffold is inserted into the implantation hole having the implantation depth, the biocompatible scaffold is about to be leveled with the surface of the cartilage. In some embodiments, the biocompatible scaffold is a biphasic scaffold. In some embodiments, the biocompatible scaffold includes a relatively less porous portion than another portion of the biocompatible scaffold. In some embodiments, biocompatible scaffold includes a relatively more porous portion than another portion of the biocompatible scaffold. In some embodiments, the biocompatible scaffold includes a portion having relatively more porosity than another portion of the biocompatible scaffold. In some embodiments, biocompatible scaffold includes a portion having relatively less porosity than another portion of the biocompatible scaffold. In some embodiments, the biocompatible scaffold includes a relatively less dense portion than another portion of the biocompatible scaffold. In some embodiments, biocompatible scaffold includes a relatively denser portion than another portion of the biocompatible scaffold. In some embodiments, the biocompatible scaffold includes a portion having relatively higher density than another portion of the biocompatible scaffold. In some embodiments, biocompatible scaffold includes a portion having relatively lower density than another portion of the biocompatible scaffold. In some embodiments, the biocompatible scaffold has a plurality of portions having different porosity values respectively. In some embodiments, the biocompatible scaffold has a plurality of portions having different density values respectively. In some embodiments, the biocompatible scaffold has a plurality of portions having different amounts of poly-L-lactic-co-glycolic acid (PLGA) respectively. In some embodiments, the biocompatible scaffold has a plurality of portions having different amounts of tricalcium phosphate (TCP) respectively. In some embodiments, the biocompatible scaffold has a plurality of portions having different amounts of poly-L-lactic-co-glycolic acid (PLGA) and/or tricalcium phosphate (TCP) respectively.

In some embodiments, the patient is an animal. In some embodiments, the patient is a human.

In some embodiments, a portion of the biocompatible scaffold has at least about 50% porosity. In some embodiments, a portion of the biocompatible scaffold has at least about 60% porosity. In some embodiments, a portion of the biocompatible scaffold has at least about 65% porosity. In some embodiments, a portion of the biocompatible scaffold has at least about 67% porosity. In some embodiments, a portion of the biocompatible scaffold has at least about 70% porosity. In some embodiments, a portion of the biocompatible scaffold has at least about 72% porosity. In some embodiments, a portion of the biocompatible scaffold has at least about 75% porosity. In some embodiments, a portion of the biocompatible scaffold has at least about 77% porosity. In some embodiments, a portion of the biocompatible scaffold has at least about 80% porosity. In some embodiments, a portion of the biocompatible scaffold has at least about 82% porosity. In some embodiments, a portion of the biocompatible scaffold has at least about 85% porosity. In some embodiments, a portion of the biocompatible scaffold has at least about 88% porosity. In some embodiments, a portion of the biocompatible scaffold has at least about 90% porosity.

In some embodiments, an average size of the plurality of pores is from about 100 µm to about 700 µm. In some embodiments, an average size of the plurality of pores is from about 150 µm to about 650 µm. In some embodiments, an average size of the plurality of pores is from about 200 µm to about 600 µm. In some embodiments, an average size of the plurality of pores is from about 200 µm to about 550 µm. In some embodiments, an average size of the plurality of pores is from about 200 µm to about 500 µm. In some embodiments, an average size of the plurality of pores is from about 225 µm to about 450 µm. In some embodiments, an average size of the plurality of pores is from about 250 µm to about 400 µm.

In some embodiments, the plurality of chondrocytes includes a plurality of autologous chondrocytes.

In some embodiments, the biocompatible scaffold includes poly-L-lactic-co-glycolic acid (PLGA). In some embodiments, the biocompatible scaffold includes tricalcium phosphate (TCP).

In some embodiments, a new approach for restoration of articular cartilage defects by ex vivo multiplied autologous cartilage has been developed. Chondrocytes from healthy articular cartilage are harvested and the extracellular matrices are digested by enzymes. Chondrocytes are multiplied outside the body for 11 to 21 days to be more than ten times the original number. The cell concentration is adjusted to $2.6 \times 10^6$-$5 \times 10^6$ cells/ml, and the cells are then injected into the defect site covered with a layer of periosteum by suturing prior to the injection. This technique faces in that chondrocytes are dedifferentiated during the ex vivo multiplication step. The originally rounded chondrocytes become spindle-shaped fibrocartilages, and the biochemical properties of the cells are also altered. In addition, the steps of obtaining and suturing autologous periosteum may not be performed under endoscope. Moreover, it requires at least two surgical procedures (i.e., one to harvest the cells and one to reimplant them); it is relatively expensive; and there are limits in the size of lesion, and the number of lesions, which can be treated.

The present disclosure relates to combining materials and cells to repair full thickness defects in cartilage or bone. Biomedical materials are selected based on the physical and mechanical properties of cartilage or bone. For cartilage, naturally occurring or synthetic bioabsorbable polymeric materials can be selected, such as collagen, gelatin, alginate, poly (glycolide), poly (lactide) (PLLA), poly (glycolide co-lactide) (PLGA). For bone, biomedical ceramic materials are selected, such as hydroxyapatite, tricalcium phosphate, calcium carbonate, or calcium sulfate. In some embodiments, a combination of bioabsorbable polymeric materials and biomedical ceramic materials to mimic bones has also been proposed. As for the structure of cartilage, porous structure is prepared to introduce surrounding tissues thereto or as a scaffold for the implanted cells. In addition, the combination of chondrocytes and gel to from a hydrogel with cells has been proposed. The hydrogel with cells can be attached on the bone-layer material to from a biphasic structure of bone and cartilage. The bone-layer material is also porous to introduce surrounding bone tissue thereto since bone tissue has a stronger regeneration ability than cartilage. As for the combination of materials and cells, small amount of autologous cartilage tissue is harvested, digested with enzymes to remove extracellular matrices and release chondrocytes, and the chondrocytes are implanted into a porous scaffold for multiplication. An appropriate number or amount of multiplied chondrocytes are then implanted to the defect site. In general, this technique is used for simple evenly-distributed tissue, not for plurally layered tissue. When two different cells are implanted in a porous matrix, cells may flow and mix since the cell size is smaller than the pore size of the matrix. The recent technique for plural layer cultivation involves ex vivo multiplication of cartilage and bone tissues separately, implantation of the multiplied cartilage and bone tissues to two different porous matrices respectively, combination of the two matrices containing cartilage and bone tissues, and fusion of the borders of the two matrices by refusion cultivation to form a biphasic matrix. This technique is, however, time-consuming and also not clinically applied yet.

In some embodiments, a more effective method of tissue repair using a plurally layered matrix can be provided, which can be a relatively more effective method.

Accordingly, some embodiments can provide a plurally layered matrix and a method of tissue repair using the same to solve the drawbacks of the conventional articular cartilage restoration. In some embodiments, the plurally layered matrix can be designed to have differential structures to grow different cells in different portions of the matrix by the structure of the matrix and the volume differences of tissues. In some embodiments, the matrix containing plurally layered tissues can be implanted into the defect site of a subject to repair the defect site with the tissues.

Some embodiments can provide a plurally layered matrix.

In some embodiments, autologous chondrocyte implantation (ACI) may use biodegradable scaffolds to reduce damage to the natural tissue, may not resect the non-weight bearing tissue, and can implant chondrocytes or chondrogenic cells on the scaffolds to regenerate cartilage layers. In some embodiments, to obtain enough cells, a pre-surgery operation and in vitro autologous chondrocyte culture may be required before implantation, but patients undergoing two surgeries, one to collect cartilage tissues and one for implantation, may increase the risk of infection. In some embodiments, periosteal or perichondral grafts may be required to fix chondrocytes on the scaffolds, which can be highly technically demanding and time-consuming. In some embodiments, the scaffold may easily shift or fall off after joint movement, and the implanted chondrocyte layer that has not recovered in the early stage may not be able to bear the force.

In some embodiments, a matrix can comprise a first element and a second element connected thereto, and the second element can comprise a hollow cavity. In some embodiments, the first and/or the second elements may be composed of a composite material comprising a bioabsorbable porous material. In some embodiments, the porous material of the first element can be for the growth of the surrounding cells of an implanted site in a living subject, and the hollow cavity of the second element may be seeded with a cell block prior to the implantation of the living subject.

In some embodiments, provided is a method of tissue repair using the plurally layered matrix as an implant or scaffold. In some embodiments, the method can comprise providing the plurally layered matrix, seeding a cell block into the hollow cavity of the plurally layered matrix, and implanting the plurally layered matrix containing the cell block into a defect site of a living subject.

In some embodiments, provided is a plurally layered implant that may be prepared by the method based on the present disclosure. In some embodiments, a plurally layered matrix, a method of tissue repair using the same, a plurally layered implant prepared thereof may be provided.

In some embodiments, the plurally layered matrix of the embodiment can be a biphasic matrix which can be implanted into a defect of cartilage and bone tissues. In some embodiments, a hollow cavity may be on the upper side of the matrix for tissue block containing cells. In some embodiments, the size differences of the tissue and the porous structure of the matrix can facilitate controlled distribution to centralize the chondrocytes in the upper cavity of the biphasic matrix. In some embodiments, the biphasic matrix can then be implanted into a defect site of a living subject to reconstruct tissue therein.

In some embodiments, a method and carrier for culturing plurally layered tissue in vitro can be provided. In some embodiments, the method can comprise providing a porous plurally layered carrier having a hollow cavity, placing tissue blocks within the hollow cavity of the porous plurally layered carrier, seeding cells into the carrier, and incubating the tissue blocks and cells within the carrier. In some embodiments, with the structure of the carrier and the volume differences between tissue blocks and cells, the tissue blocks and cells can be grown into a two-layered cartilage tissue in vitro for plurally layered tissue repair. In some embodiments, modified the method and carrier can be modified such that the plurally layered porous matrix containing cells or tissue blocks can be directly implanted into the defect site of a living subject without the ex vivo incubation step. In some embodiments, the plurally layered porous matrix containing tissue blocks or cells can then be subjected to Mosaic Plasty procedure. In some embodiments, a fillister having similar size to the biphasic matrix may be created on the defect site of a living subject. In some embodiments, an autologous cartilage tissue block can be collected from the unstressed area of the articular cartilage. In some embodiments, for enhancing the filling area, the cartilage tissue can be minced into small pieces and digested by enzymes to release chondrocytes. In some embodiments, the partially digested tissue blocks can then be placed into the hollow cavity of the biphasic matrix. In some embodiments, tissue blocks can be centralized in the upper hollow cavity since the pore size of the porous structure surrounding the hollow cavity may be smaller than the tissue blocks. In some embodiments, the biphasic implant containing the tissue blocks can then be implanted into the fillister on the defect of the articular cartilage to regenerate tissue and repair the articular cartilage defect. In some embodiments, autologous chondrocytes can be multiplied in vitro, the cell blocks or cells combined with gel or other biomaterials can be placed into the hollow cavity of the biphasic matrix, and the biphasic matrix containing the cells can be implanted into a fillister created on the defect site to repair large defect area.

In some embodiments, with the embodiment of the method of tissue repair, only a small amount of cartilage tissue rather than bone tissue may be collected for the implant, avoiding destruction of the integrity and mechanical property of the joint. In some embodiments, the collected tissue blocks can be minced and digested with enzyme, enlarging the repair area and enhancing cell propagation and fusion effects. In some embodiments, this method can be a one-step operation which can be manipulated under endoscope to reduce pain and hospitalization time.

Some embodiments may provide a plurally layered matrix. In some embodiments, the matrix can comprise a first element and a second element connected thereto, and the second element can comprise a hollow cavity. In some embodiments, the first and the second elements may be composed of a composite material comprising a bioabsorbable porous material. In some embodiments, it may be provided that the porous material of the first element can be for the growth of the surrounding cells of an implanted site in a living subject, and the hollow cavity of the second element can be seeded with a cell block prior to the implantation of the living subject to restore the implant site.

In some embodiments, the composite material comprising the bioabsorbable porous material can include, but is not limited to, polylactic acid (PLA), polyglycolic acid (PGA), poly (glycolide co-lactide) (PLGA), polyanhydride, polycapralactone (PCL), polydiester, polyorthoester, collagen, gelatin, hyaluronic acid, chitosan, or polyethylene glycol (PEG), preferably poly (glycolide co-lactide) (PLGA). In some embodiments, the pore size of the porous matrix can range from 50 to 1000 μm. In some embodiments, the composite material may further comprise other materials, including, but not limited to, hydroxyapatite (HAP), tricalcium phosphate (TCP), tetracalcium phosphate (TTCP), dicalcium phosphate anhydrous (DCPA), dicalcium phosphate dihydrate (DCPD), octacalcium phosphate (OCP), or calcium pyrophosphate (CPP), preferably tricalcium phosphate (TCP), or any combination thereof.

For example, in some embodiments, biodegradable polymers, such as poly (glycolide co-lactide) (PLGA), can be used in the preparation of plurally layered porous matrices. In some embodiments, these polymers may be prepared by ring-open polymerization and can have molecular weights in the range of hundreds of thousands, as determined by gel permeation chromatography.

In some embodiments, PLGA can be mixed with biomedical ceramic powders, such as tricalcium phosphate (TCP). In some embodiments, sodium chloride particles may be added to produce apertures in the matrix. In some embodiments, organic solvents, like acetone, can be used to dissolve polymeric particles.

In some embodiments, the preparation of the plurally layered matrix may involve several steps, for example at least some of the following steps:
Dissolving PLGA in an Organic Solvent
    Adding sodium chloride particles to create a mixture
    Pouring the mixture into a mold and allowing the solvent to evaporate
    Creating PLGA/TCP composite particles
    Combining the PLGA/TCP particles with NaCl particles
    Assembling the layers of the matrix using a filtering flask and applying negative pressure
    Washing out the NaCl particles and remaining solvent
    Drying and sterilizing the final product In some embodiments, the resulting plurally layered porous matrix can have an upper hollow cavity. The matrix may be sterilized using alcohol and phosphate buffered saline (PBS). The ratios of materials, particle sizes, and processing conditions can be adjusted to achieve desired properties in the final matrix. For example, the ratio of PLGA to NaCl or PLGA to TCP can be varied, and particle sizes can be controlled through sieving. This process can produce a plurally layered porous matrix suitable for various biomedical applications, particularly in tissue engineering and regenerative medicine.

In some embodiments, the embodiment of the plurally layered matrix, when used for joint defect repair, can be implanted into a joint of a living subject. In some embodiments, the cell block can be cartilage. In some embodiments, the cartilage can be obtained from the implantation subject or from other living organisms. In some embodiments, the cartilage tissue can be incubated ex vivo. In some embodiments, the size of the cell blocks can range from 100 to 2,000 μm.

For example, in some embodiments, the prepared plurally layered porous matrix can have a two layered structure with an upper hollow cavity surrounded by a thick wall and a lower evenly porous structure. In some embodiments, the porous structure surrounding the hollow cavity has a pore size of 112±41 μm and a porosity of 84.2±2.4 vol %. The porous structure beneath the hollow cavity has a pore size of 115±57 μm and a porosity of 86.6±3.1 vol %. The interface between the porous structures surrounding and beneath the hollow cavity is interconnected, with no closed interface observed. This interconnected structure allows for seamless integration between the different layers of the matrix.

In some embodiments, a method of tissue repair using the plurally layered matrix may be provided. In some embodiments, the method can comprise providing the plurally layered matrix, seeding a cell block into the hollow cavity of the plurally layered matrix, and implanting the plurally layered matrix containing the cell block into a defect site of a living subject.

In some embodiments, the cell block can be a minced tissue block, a tissue and cell aggregate prepared from a tissue block minced and digested with enzymes to release partial cells from the tissue block, or an in vitro multiplied cell block combined with gel. In some embodiments, the enzyme digestion time can range from 5 min to 24 hours. In some embodiments, the enzymes can include, but are not limited to, collagenase, hyaluronidase, trypsin, or proteinase. In some embodiments, when the defect site is located on a joint, the cell block can be cartilage, and the enzyme can be collagenase.

In some embodiments, the cell block can be a cell aggregate from in vitro cultivation of a cell. In some embodiments, when the implant site is a joint defect, a chondrocyte can be in vitro cultured to form the cell aggregate.

In some embodiments, the cell block can be a granular carrier attached with cells if necessary.

In some embodiments, the size of the cell block can be larger than the pore size of the porous material. For example, in some embodiments, the size of the cell block can range from 100 to 2,000 μm.

For example, in some embodiments, autologous cartilage can be collected from the unstressed site of a joint until the subchondral bone is exposed. In some embodiments, the collected cartilage can be minced and filtered to achieve a size ranging from 560-800 μm. In some embodiments, the filtered cartilage tissues can be treated with collagenase to partially release the chondrocytes.

In some embodiments, the enzyme-treated cartilage tissues can be injected into the hollow cavity of a plurally layered porous matrix. In some embodiments, the tissue blocks may centralize in the upper cavity since they are larger than the pore size of the matrix, forming a biphasic matrix with the upper cavity containing cartilage tissues and chondrocytes, and a lower porous matrix.

In some embodiments, when implanted in vivo, the biphasic matrix can remain intact, and new cartilage tissue can grow at the site of the hollow cavity. In some embodiments, a cartilage tissue layer can be newly formed at the site of the hollow cavity, extending toward the lower porous structure to form an interface between cartilage and bone. In some embodiments, the implanted cartilage tissues fuse without clear interfaces between tissue blocks.

In some embodiments, the cartilage tissue at the hollow cavity can secrete hyaline cartilage-specific substances such as type II collagen and does not dedifferentiate into fibrocartilages.

In some embodiments, the implant after a time period can result in the defect site covered with a layer of new cartilage tissues and new bone tissue extending into the implant.

In some embodiments, the biphasic implant can effectively form a new cartilage layer at the hollow cavity of the matrix containing cartilage tissues. In some embodiments, the implant can effectively repair these defects, showing potential clinical applications in cartilage repair and regeneration.

In some embodiments, the CHONDROPLUG™ implant may be a modification from the mosaicplasty and autologous chondrocyte implantation (ACI) methods, which can remove ECM by enzymatic digestion and process the autologous cartilage into suspended chondrocytes at the bedside in the operating room without a second surgery. In some embodiments, through enzymatic digestion, the migration ability and the cartilage-related protein expression of chondrocytes may be enhanced, thereby potentially improving the distribution of cells in the defect area, the connection with surrounding tissues, and the thickness and function of the cartilage after repair. In some embodiments, the special structural design of the scaffolds which can insert and keep suspended chondrocytes in the porous and biodegradable polymer layer of the implants may bypass the uses of periosteal or perichondral grafts, provide space for chondrocytes growth, and enhance the mechanical strength for the cartilage layer in the early stage. In some embodiments, biphase biodegradable scaffolds may simultaneously provide growth spaces for the cartilage and mineral bone to shorten the recovery period.

In some embodiments, an implant material or device, such as the CHONDROPLUG™, may comprise various materials, such as bioabsorbable poly-L-lactic-co-glycolic acid (PLGA) for chondrocytes loading and cartilage repair, and a mixture of PLGA and tricalcium phosphate (TCP) for the osteocytes growth of mineral bone phase. In some embodiments, an implant material or device, such as the CHONDROPLUG™, may consist of bioabsorbable poly-L-lactic-co-glycolic acid (PLGA) for chondrocytes loading and cartilage repair, and a mixture of PLGA and tricalcium phosphate (TCP) for the osteocytes growth of mineral bone phase. In some embodiments, when PLGA is degraded, the hydrolysis reaction may generate lactic and glycolic acids and create an acidic environment at the defect site. In some embodiments, the acidic environment can induce the release of pro-inflammatory cytokines and increase osteoblasts autophagy. In some embodiments, the injured mineral bone may be very fragile during the first 4 to 6 weeks of the healing process and may take months to years to reach original mechanical strength.

In some embodiments, the procedure of the CHONDROPLUG™ implant can be utilized based on different methods. For example, in some embodiments, the scaffolds may be trimmed to cut the PLGA volume of grafts, potentially reduce the damage to the mineral bone, and shorten its recovery period.

In some embodiments, to prepare the implant plug, first, autologous full-thickness cartilage from an animal or human can be obtained or harvested. In some embodiments, chondrocytes from the harvested cartilage can be isolated using, e.g., enzymes and related solutions. In some embodiments, the isolated autologous chondrocytes can be injected into the chondral phase of the CHONDROPLUG™ implant. In some embodiments, the cell-seeded implant can be placed into a custom trimming device, which may incorporate various shapes for trimming, such as a cylindrical notch, and trimming blade. In some embodiments, the implant can be positioned so that the chondral phase is inside the notch and bone phase is exposed. The trimming blade can be used to cut and remove the exposed bone phase portion. The resulting trimmed implant with only the chondral phase remaining is the final trimmed plug for use.

In some embodiments, based on previous studies, the thickness of the knee cartilage is approximately 3 mm so CHONDROPLUG™ implants may be trimmed to about 3.5 mm which can include the extent of the cartilage, subchondral bone, and a little bit of mineral bone. In some embodiments, based on previous studies, the thickness of the knee cartilage is approximately 3 mm so CHONDROPLUG™ implants may be trimmed to about 4.0 mm which can include the extent of the cartilage, subchondral bone, and a little bit of mineral bone. In some embodiments, based on previous studies, the thickness of the knee cartilage is approximately 3 mm so CHONDROPLUG™ implants may be trimmed to about 4.2 mm which can include the extent of the cartilage, subchondral bone, and a little bit of mineral bone. In some embodiments, based on previous studies, the thickness of the knee cartilage is approximately 3 mm so CHONDROPLUG™ implants may be trimmed to 4.5 mm which can include the extent of the cartilage, subchondral bone, and a little bit of mineral bone. In some embodiments, based on the thickness of the knee cartilage, CHONDROPLUG™ implants may be trimmed to about 5 mm which can include the extent of the cartilage, subchondral bone, and possibly a part of mineral bone. In some embodiments, based on the thickness of the knee cartilage, CHONDROPLUG™ implants may be trimmed to about 6 mm which can include the extent of the cartilage, subchondral bone, and possibly a part of mineral bone. In some embodiments, based on the thickness of the knee cartilage, CHONDROPLUG™ implants may be trimmed to about 7 mm which can include the extent of the cartilage, subchondral bone, and possibly a part of mineral bone. In some embodiments, based on the thickness of the knee cartilage, CHONDROPLUG™ implants may be trimmed to about 8 mm which can include the extent of the cartilage, subchondral bone, and possibly a part of mineral bone. In some embodiments, based on the thickness of the knee cartilage, CHONDROPLUG™ implants may be trimmed to about 9 mm which can include the extent of the cartilage, subchondral bone, and possibly a part of mineral bone. In some embodiments, based on the thickness of the knee cartilage, CHONDROPLUG™ implants may be trimmed to about 10 mm which can include the extent of the cartilage, subchondral bone, and possibly a part of mineral bone. In some embodiments, based on the thickness of the knee cartilage, CHONDROPLUG™ implants may be trimmed to about 11 mm which can include the extent of the cartilage, subchondral bone, and possibly a part of mineral bone. In some embodiments, based on the thickness of the knee cartilage, CHONDROPLUG™ implants may be trimmed to about 12 mm which can include the extent of the cartilage, subchondral bone, and possibly a part of mineral bone. In some embodiments, the reason for including subchondral bone and a small amount of mineral bone may be to avoid implant dislodgement or fall off. In some embodiments, the trimmed CHONDROPLUG™ implants may be considered to combine the advantages of mosaicplasty, autologous chondrocyte implantation (ACI) and original CHONDROPLUG™ implants, potentially excluding the possible risks of implantation. In this study, we used a porcine distal thigh cartilage defect model to examine the repair effect of the trimmed CHONDROPLUG™ implant and evaluated effects by using bioimaging, histology and mechanical compression testing.

Non-Limiting Embodiments

The present disclosure is also described by way of the following non-limiting embodiments. However, the use of these and other embodiments anywhere in the specification is illustrative only and in no way limits the scope and meaning of the disclosure. Likewise, the disclosure is not limited to any particular preferred embodiment or aspect described herein. Indeed, modifications and variations may be apparent to those skilled in the art upon reading this specification, and such variations can be made without departing from the disclosure in spirit or in scope.

1. A transplantable implant comprising:
 a biocompatible scaffold configured to be degraded over time when implanted to cartilage of a patient, the biocompatible scaffold comprising a plurality of pores;
 a plurality of chondrocytes incorporated into the scaffold, wherein, about 12 months after the implant is implanted to the cartilage, the implant results in a recovery state of the cartilage exhibiting from about 0.20 to about 0.30 strain in response to about 14 MPa or more of stress.

2. The transplantable implant of Embodiment 1, wherein, about 12 months after the implant is implanted to the cartilage, the implant results in the recovery state of the cartilage exhibiting from about 0.20 to about 0.30 strain in response to about 14.5 MPa or more of stress.

3. The transplantable implant of Embodiment 1, wherein, about 12 months after the implant is implanted to the cartilage, the implant results in the recovery state of the cartilage exhibiting from about 0.20 to about 0.30 strain in response to about 14.8 MPa or more of stress.

4. The transplantable implant of Embodiment 1, wherein, about 12 months after the implant is implanted to the cartilage, the implant results in the recovery state of the cartilage exhibiting from about 0.20 to about 0.30 strain in response to about 14.9 MPa or more of stress.

5. The transplantable implant of Embodiment 1, wherein, about 12 months after the implant is implanted to the cartilage, the implant results in the recovery state of the cartilage exhibiting from about 0.20 to about 0.30 strain in response to about 15.0 MPa or more of stress.

6. The transplantable implant of Embodiment 1, wherein, about 12 months after the implant is implanted to the cartilage, the implant results in the recovery state of the cartilage exhibiting from about 0.20 to about 0.30 strain in response to about 15.2 MPa or more of stress.

7. The transplantable implant of Embodiment 1, wherein, about 12 months after the implant is implanted to the cartilage, the implant results in the recovery state of the cartilage exhibiting from about 0.20 to about 0.30 strain in response to about 15.5 MPa or more of stress.

8. The transplantable implant of Embodiment 1, wherein, about 12 months after the implant is implanted to the cartilage, the implant results in the recovery state of the cartilage exhibiting from about 0.20 to about 0.30 strain in response to about 16.0 MPa or more of stress.

9. The transplantable implant of Embodiment 1, wherein, about 12 months after the implant is implanted to the cartilage, the implant results in the recovery state of the cartilage exhibiting from about 0.20 to about 0.30 strain in response to about 16.5 MPa or more of stress.

10. The transplantable implant of Embodiment 1, wherein, about 12 months after the implant is implanted to the cartilage, the implant results in the recovery state of the cartilage exhibiting from about 0.20 to about 0.30 strain in response to about 17.0 MPa or more of stress.

11. The transplantable implant of Embodiment 1, wherein, about 12 months after the implant is implanted to the cartilage, the implant results in the recovery state of the cartilage exhibiting from about 0.20 to about 0.30 strain in response to about 17.5 MPa or more of stress.

12. The transplantable implant of Embodiment 1, wherein, about 12 months after the implant is implanted to the cartilage, the implant results in the recovery state of the cartilage exhibiting from about 0.20 to about 0.30 strain in response to about 18.0 MPa or more of stress.

13. The transplantable implant of Embodiment 1, wherein, about 12 months after the implant is implanted to the cartilage, the implant results in the recovery state of the cartilage exhibiting from about 0.20 to about 0.30 strain in response to about 19.0 MPa or more of stress.

14. The transplantable implant of Embodiment 1, wherein, about 12 months after the implant is implanted to the cartilage, the implant results in the recovery state of the cartilage exhibiting from about 0.20 to about 0.30 strain in response to about 19.5 MPa or more of stress.

15. The transplantable implant of Embodiment 1, wherein, about 12 months after the implant is implanted to the cartilage, the implant results in the recovery state of the cartilage exhibiting from about 0.20 to about 0.30 strain in response to about 19.7 MPa or more of stress.

16. The transplantable implant of Embodiment 1, wherein, about 12 months after the implant is implanted to the cartilage, the implant results in the recovery state of the cartilage exhibiting from about 0.20 to about 0.30 strain in response to about 20.0 MPa or more of stress.

17. The transplantable implant of Embodiment 1, wherein, about 12 months after the implant is implanted to the cartilage, the implant results in the recovery state of the cartilage exhibiting from about 0.20 to about 0.30 strain in response to about 20.2 MPa or more of stress.

18. The transplantable implant of Embodiment 1, wherein, about 12 months after the implant is implanted to the cartilage, the implant results in the recovery state of the cartilage exhibiting from about 0.20 to about 0.30 strain in response to about 20.5 MPa or more of stress.

19. The transplantable implant of Embodiment 1, wherein, about 12 months after the implant is implanted to the cartilage, the implant results in the recovery state of the cartilage exhibiting from about 0.20 to about 0.30 strain in response to about 21.0 MPa or more of stress.

20. The transplantable implant of Embodiment 1, wherein, about 12 months after the implant is implanted to the cartilage, the implant results in the recovery state of the cartilage exhibiting from about 0.20 to about 0.30 strain in response to about 23.0 MPa or more of stress.

21. The transplantable implant of Embodiment 1, wherein, about 12 months after the implant is implanted to the cartilage, the implant results in the recovery state of the cartilage exhibiting from about 0.20 to about 0.30 strain in response to about 25.0 MPa or more of stress.

22. The transplantable implant of Embodiment 1, wherein, about 12 months after the implant is implanted to the cartilage, the implant results in the recovery state of the cartilage exhibiting from about 0.20 to about 0.30 strain in response to from about 14.0 MPa to about 25.0 MPa of stress.

23. The transplantable implant of Embodiment 1, wherein, about 12 months after the implant is implanted to the cartilage, the implant results in the recovery state of the cartilage exhibiting from about 0.20 to about 0.30 strain in response to from about 14.8 MPa to about 24.0 MPa of stress.

24. The transplantable implant of Embodiment 1, wherein, about 12 months after the implant is implanted to the cartilage, the implant results in the recovery state of the cartilage exhibiting from about 0.20 to about 0.30 strain in response to from about 15.0 MPa to about 23.0 MPa of stress.

25. The transplantable implant of Embodiment 1, wherein, about 12 months after the implant is implanted to the cartilage, the implant results in the recovery state of the cartilage exhibiting from about 0.20 to about 0.30 strain in response to from about 15.5 MPa to about 22.0 MPa of stress.

26. The transplantable implant of Embodiment 1, wherein, about 12 months after the implant is implanted to the cartilage, the implant results in the recovery state of the cartilage exhibiting from about 0.20 to about 0.30 strain in response to from about 16.0 MPa to about 21.0 MPa of stress.

27. A transplantable implant comprising:
a biocompatible scaffold configured to be degraded over time when implanted to cartilage of a patient, the biocompatible scaffold comprising a plurality of pores;
a plurality of chondrocytes incorporated into the scaffold, wherein, about 12 months after the implant is implanted to the cartilage, the implant results in a recovery state of the cartilage exhibiting about 6 mm to about 9 mm of displacement upon application of about 6100 N of load force.

28. The transplantable implant of Embodiment 27, wherein, about 12 months after the implant is implanted to the cartilage, the implant results in the recovery state of the cartilage exhibiting about 6 mm to about 9 mm of displacement upon application of about 6150 N of load force.

29. The transplantable implant of Embodiment 27, wherein, about 12 months after the implant is implanted to the cartilage, the implant results in the recovery state of the cartilage exhibiting about 6 mm to about 9 mm of displacement upon application of about 6200 N of load force.

30. The transplantable implant of Embodiment 27, wherein, about 12 months after the implant is implanted to the cartilage, the implant results in the recovery state of the cartilage exhibiting about 6 mm to about 9 mm of displacement upon application of about 6300 N of load force.

31. The transplantable implant of Embodiment 27, wherein, about 12 months after the implant is implanted to the cartilage, the implant results in the recovery state of the cartilage exhibiting about 6 mm to about 9 mm of displacement upon application of about 6400 N of load force.

32. The transplantable implant of Embodiment 27, wherein, about 12 months after the implant is implanted to the cartilage, the implant results in the recovery state of the cartilage exhibiting about 6 mm to about 9 mm of displacement upon application of about 6500 N of load force.

33. The transplantable implant of Embodiment 27, wherein, about 12 months after the implant is implanted to the cartilage, the implant results in the recovery state of the cartilage exhibiting about 6 mm to about 9 mm of displacement upon application of about 7000 N of load force.

34. The transplantable implant of Embodiment 27, wherein, about 12 months after the implant is implanted to the cartilage, the implant results in the recovery state of the cartilage exhibiting about 6 mm to about 9 mm of displacement upon application of about 7300 N of load force.

35. The transplantable implant of Embodiment 27, wherein, about 12 months after the implant is implanted to the cartilage, the implant results in the recovery state of the cartilage exhibiting about 6 mm to about 9 mm of displacement upon application of about 7500 N of load force.

36. The transplantable implant of Embodiment 27, wherein, about 12 months after the implant is implanted to the cartilage, the implant results in the recovery state of the cartilage exhibiting about 6 mm to about 9 mm of displacement upon application of about 7700 N of load force.

37. The transplantable implant of Embodiment 27, wherein, about 12 months after the implant is implanted to the cartilage, the implant results in the recovery state of the cartilage exhibiting about 6 mm to about 9 mm of displacement upon application of about 8000 N of load force.

38. The transplantable implant of Embodiment 27, wherein, about 12 months after the implant is implanted to the cartilage, the implant results in the recovery state of the cartilage exhibiting about 6 mm to about 9 mm of displacement upon application of about 8300 N of load force.

39. The transplantable implant of Embodiment 27, wherein, about 12 months after the implant is implanted to the cartilage, the implant results in the recovery state of the cartilage exhibiting about 6 mm to about 9 mm of displacement upon application of about 8400 N of load force.

40. The transplantable implant of Embodiment 27, wherein, about 12 months after the implant is implanted to the cartilage, the implant results in the recovery state of the cartilage exhibiting about 6 mm to about 9 mm of displacement upon application of about 8500 N of load force.

41. The transplantable implant of Embodiment 27, wherein, about 12 months after the implant is implanted to the cartilage, the implant results in the recovery state of the cartilage exhibiting about 6 mm to about 9 mm of displacement upon application of about 8700 N of load force.

42. The transplantable implant of Embodiment 27, wherein, about 12 months after the implant is implanted to the cartilage, the implant results in the recovery state of the cartilage exhibiting about 6 mm to about 9 mm of displacement upon application of about 9000 N of load force.

43. A transplantable implant comprising:
a biocompatible scaffold configured to be degraded over time when implanted to cartilage of a patient, the biocompatible scaffold comprising a plurality of pores;
a plurality of chondrocytes incorporated into the scaffold, wherein, about 12 months after the implant is implanted to the cartilage, the implant results in a recovery state of the cartilage exhibiting:
from about 0.20 to about 0.30 strain in response to about 14 MPa or more of stress, and
about 6 mm to about 9 mm of displacement upon application of about 6100 N of load force.

44. The transplantable implant of Embodiment 43, wherein, about 12 months after the implant is implanted to the cartilage, the implant results in the recovery state of the cartilage exhibiting from about 0.20 to about 0.30 strain in response to about 14.5 MPa or more of stress.

45. The transplantable implant of Embodiment 43, wherein, about 12 months after the implant is implanted to the cartilage, the implant results in the recovery state of the cartilage exhibiting from about 0.20 to about 0.30 strain in response to about 14.8 MPa or more of stress.

46. The transplantable implant of Embodiment 43, wherein, about 12 months after the implant is implanted to the cartilage, the implant results in the recovery state of the cartilage exhibiting from about 0.20 to about 0.30 strain in response to about 14.9 MPa or more of stress.

47. The transplantable implant of Embodiment 43, wherein, about 12 months after the implant is implanted to the cartilage, the implant results in the recovery state of the cartilage exhibiting from about 0.20 to about 0.30 strain in response to about 15.0 MPa or more of stress.

48. The transplantable implant of Embodiment 43, wherein, about 12 months after the implant is implanted to the cartilage, the implant results in the recovery state of the cartilage exhibiting from about 0.20 to about 0.30 strain in response to about 15.2 MPa or more of stress.

49. The transplantable implant of Embodiment 43, wherein, about 12 months after the implant is implanted to the cartilage, the implant results in the recovery state of the cartilage exhibiting from about 0.20 to about 0.30 strain in response to about 15.5 MPa or more of stress.

50. The transplantable implant of Embodiment 43, wherein, about 12 months after the implant is implanted to the cartilage, the implant results in the recovery state of the cartilage exhibiting from about 0.20 to about 0.30 strain in response to about 16.0 MPa or more of stress.

51. The transplantable implant of Embodiment 43, wherein, about 12 months after the implant is implanted to the cartilage, the implant results in the recovery state of the cartilage exhibiting from about 0.20 to about 0.30 strain in response to about 16.5 MPa or more of stress.

52. The transplantable implant of Embodiment 43, wherein, about 12 months after the implant is implanted to the cartilage, the implant results in the recovery state of the cartilage exhibiting from about 0.20 to about 0.30 strain in response to about 17.0 MPa or more of stress.

53. The transplantable implant of Embodiment 43, wherein, about 12 months after the implant is implanted to the cartilage, the implant results in the recovery state of the cartilage exhibiting from about 0.20 to about 0.30 strain in response to about 17.5 MPa or more of stress.

54. The transplantable implant of Embodiment 43, wherein, about 12 months after the implant is implanted to the cartilage, the implant results in the recovery state of the cartilage exhibiting from about 0.20 to about 0.30 strain in response to about 18.0 MPa or more of stress.

55. The transplantable implant of Embodiment 43, wherein, about 12 months after the implant is implanted to the cartilage, the implant results in the recovery state of the cartilage exhibiting from about 0.20 to about 0.30 strain in response to about 19.0 MPa or more of stress.

56. The transplantable implant of Embodiment 43, wherein, about 12 months after the implant is implanted to the cartilage, the implant results in the recovery state of the cartilage exhibiting from about 0.20 to about 0.30 strain in response to about 19.5 MPa or more of stress.

57. The transplantable implant of Embodiment 43, wherein, about 12 months after the implant is implanted to the cartilage, the implant results in the recovery state of the cartilage exhibiting from about 0.20 to about 0.30 strain in response to about 19.7 MPa or more of stress.

58. The transplantable implant of Embodiment 43, wherein, about 12 months after the implant is implanted to the cartilage, the implant results in the recovery state of the cartilage exhibiting from about 0.20 to about 0.30 strain in response to about 20.0 MPa or more of stress.

59. The transplantable implant of Embodiment 43, wherein, about 12 months after the implant is implanted to the cartilage, the implant results in the recovery state of the cartilage exhibiting from about 0.20 to about 0.30 strain in response to about 20.2 MPa or more of stress.

60. The transplantable implant of Embodiment 43, wherein, about 12 months after the implant is implanted to the cartilage, the implant results in the recovery state of the cartilage exhibiting from about 0.20 to about 0.30 strain in response to about 20.5 MPa or more of stress.

61. The transplantable implant of Embodiment 43, wherein, about 12 months after the implant is implanted to the cartilage, the implant results in the recovery state of the cartilage exhibiting from about 0.20 to about 0.30 strain in response to about 21.0 MPa or more of stress.

62. The transplantable implant of Embodiment 43, wherein, about 12 months after the implant is implanted to the cartilage, the implant results in the recovery state of the cartilage exhibiting from about 0.20 to about 0.30 strain in response to about 23.0 MPa or more of stress.

63. The transplantable implant of Embodiment 43, wherein, about 12 months after the implant is implanted to the cartilage, the implant results in the recovery state of the cartilage exhibiting from about 0.20 to about 0.30 strain in response to about 25.0 MPa or more of stress.

64. The transplantable implant of Embodiment 43, wherein, about 12 months after the implant is implanted to the cartilage, the implant results in the recovery state of the cartilage exhibiting from about 0.20 to about 0.30 strain in response to from about 14.0 MPa to about 25.0 MPa of stress.

65. The transplantable implant of Embodiment 43, wherein, about 12 months after the implant is implanted to the cartilage, the implant results in the recovery state of the cartilage exhibiting from about 0.20 to about 0.30 strain in response to from about 14.8 MPa to about 24.0 MPa of stress.

66. The transplantable implant of Embodiment 43, wherein, about 12 months after the implant is implanted to the cartilage, the implant results in the recovery state of the cartilage exhibiting from about 0.20 to about 0.30 strain in response to from about 15.0 MPa to about 23.0 MPa of stress.

67. The transplantable implant of Embodiment 43, wherein, about 12 months after the implant is implanted to the cartilage, the implant results in the recovery state of the cartilage exhibiting from about 0.20 to about 0.30 strain in response to from about 15.5 MPa to about 22.0 MPa of stress.

68. The transplantable implant of Embodiment 43, wherein, about 12 months after the implant is implanted to the cartilage, the implant results in the recovery state of the cartilage exhibiting from about 0.20 to about 0.30 strain in response to from about 16.0 MPa to about 21.0 MPa of stress.

69. The transplantable implant of Embodiment 43-68, wherein, about 12 months after the implant is implanted to the cartilage, the implant results in the recovery state of the cartilage exhibiting about 6 mm to about 9 mm of displacement upon application of about 6 mm to about 9 mm of displacement upon application of about 6100 N of load force.

70. The transplantable implant of Embodiment 43-68, wherein, about 12 months after the implant is implanted to the cartilage, the implant results in the recovery state of the cartilage exhibiting about 6 mm to about 9 mm of displacement upon application of about 6200 N of load force.

71. The transplantable implant of Embodiment 43-68, wherein, about 12 months after the implant is implanted to the cartilage, the implant results in the recovery state of the cartilage exhibiting about 6 mm to about 9 mm of displacement upon application of about 6300 N of load force.

72. The transplantable implant of Embodiment 43-68, wherein, about 12 months after the implant is implanted to the cartilage, the implant results in the recovery state of the cartilage exhibiting about 6 mm to about 9 mm of displacement upon application of about 6400 N of load force.

73. The transplantable implant of Embodiment 43-68, wherein, about 12 months after the implant is implanted to the cartilage, the implant results in the recovery state of the cartilage exhibiting about 6 mm to about 9 mm of displacement upon application of about 6500 N of load force.

74. The transplantable implant of Embodiment 43-68, wherein, about 12 months after the implant is implanted to the cartilage, the implant results in the recovery state of the cartilage exhibiting about 6 mm to about 9 mm of displacement upon application of about 7000 N of load force.

75. The transplantable implant of Embodiment 43-68, wherein, about 12 months after the implant is implanted to the cartilage, the implant results in the recovery state of the cartilage exhibiting about 6 mm to about 9 mm of displacement upon application of about 7300 N of load force.

76. The transplantable implant of Embodiment 43-68, wherein, about 12 months after the implant is implanted to the cartilage, the implant results in the recovery state of the cartilage exhibiting about 6 mm to about 9 mm of displacement upon application of about 7500 N of load force.

77. The transplantable implant of Embodiment 43-68, wherein, about 12 months after the implant is implanted to the cartilage, the implant results in the recovery state of the cartilage exhibiting about 6 mm to about 9 mm of displacement upon application of about 7700 N of load force.

78. The transplantable implant of Embodiment 43-68, wherein, about 12 months after the implant is implanted to the cartilage, the implant results in the recovery state of the cartilage exhibiting about 6 mm to about 9 mm of displacement upon application of about 8000 N of load force.

79. The transplantable implant of Embodiment 43-68, wherein, about 12 months after the implant is implanted to the cartilage, the implant results in the recovery state of the cartilage exhibiting about 6 mm to about 9 mm of displacement upon application of about 8300 N of load force.

80. The transplantable implant of Embodiment 43-68, wherein, about 12 months after the implant is implanted to the cartilage, the implant results in the recovery state of the cartilage exhibiting about 6 mm to about 9 mm of displacement upon application of about 8400 N of load force.

81. The transplantable implant of Embodiment 43-68, wherein, about 12 months after the implant is implanted to the cartilage, the implant results in the recovery state of the cartilage exhibiting about 6 mm to about 9 mm of displacement upon application of about 8500 N of load force.

82. The transplantable implant of Embodiment 43-68, wherein, about 12 months after the implant is implanted to the cartilage, the implant results in the recovery state of the cartilage exhibiting about 6 mm to about 9 mm of displacement upon application of about 8700 N of load force.

83. The transplantable implant of Embodiment 43-68, wherein, about 12 months after the implant is implanted to the cartilage, the implant results in the recovery state of the cartilage exhibiting about 6 mm to about 9 mm of displacement upon application of about 9000 N of load force.

84. The transplantable implant of Embodiment 1-83, wherein the implant has a full longitudinal length and to be implanted to an implantation hole created on the cartilage, wherein the implantation hole has an implantation depth, wherein the implant along the full longitudinal length has a first longitudinal length corresponding to the cartilage portion in the implantation hole along the implantation depth and optionally a second longitudinal length corresponding to a mineral bone portion in the implantation hole along the implantation depth when the implant is implanted to the implantation hole, wherein the ratio of the first longitudinal length to the full longitudinal length is at least about 0.3.

85. The transplantable implant of Embodiment 84, wherein the full longitudinal length is about 10 mm or less.

86. The transplantable implant of Embodiment 1-83, wherein the implant has a full longitudinal length to be implanted to an implantation hole created on the cartilage, wherein the full longitudinal length is about 10 mm or less, wherein the implant along the full longitudinal length has a first longitudinal length corresponding to the cartilage portion in the implantation hole along the implantation depth and optionally a second longitudinal length corresponding to a mineral bone portion in the implantation hole along the implantation depth when the implant is implanted to the implantation hole.

87. The transplantable implant of Embodiment 84-86, wherein the ratio of the first longitudinal length to the full longitudinal length is at least about 0.33.

88. The transplantable implant of Embodiment 84-86, wherein the ratio of the first longitudinal length to the full longitudinal length is at least about 0.35.

89. The transplantable implant of Embodiment 84-86, wherein the ratio of the first longitudinal length to the full longitudinal length is at least about 0.4.

90. The transplantable implant of Embodiment 84-86, wherein the ratio of the first longitudinal length to the full longitudinal length is at least about 0.5.

91. The transplantable implant of Embodiment 84-86, wherein the ratio of the first longitudinal length to the full longitudinal length is at least about 0.55.

92. The transplantable implant of Embodiment 84-86, wherein the ratio of the first longitudinal length to the full longitudinal length is at least about 0.6.

93. The transplantable implant of Embodiment 84-86, wherein the ratio of the first longitudinal length to the full longitudinal length is at least about 0.62.

94. The transplantable implant of Embodiment 84-86, wherein the ratio of the first longitudinal length to the full longitudinal length is at least about 0.64.

95. The transplantable implant of Embodiment 84-86, wherein the ratio of the first longitudinal length to the full longitudinal length is at least about 0.65.

96. The transplantable implant of Embodiment 84-86, wherein the ratio of the first longitudinal length to the full longitudinal length is at least about 0.66.

97. The transplantable implant of Embodiment 84-86, wherein the ratio of the first longitudinal length to the full longitudinal length is at least about 0.67.

98. The transplantable implant of Embodiment 84-86, wherein the ratio of the first longitudinal length to the full longitudinal length is at least about 0.68.

99. The transplantable implant of Embodiment 84-86, wherein the ratio of the first longitudinal length to the full longitudinal length is at least about 0.69.

100. The transplantable implant of Embodiment 84-86, wherein the ratio of the first longitudinal length to the full longitudinal length is at least about 0.7.

101. The transplantable implant of Embodiment 84-86, wherein the ratio of the first longitudinal length to the full longitudinal length is at least about 0.8.

102. The transplantable implant of Embodiment 84-86, wherein the ratio of the first longitudinal length to the full longitudinal length is at least about 0.9.

103. The transplantable implant of Embodiment 84-86, wherein the ratio of the first longitudinal length to the full longitudinal length is at least about 1.

104. The transplantable implant of Embodiment 84-86, wherein the ratio of the first longitudinal length to the full longitudinal length is up to about 1.

105. The transplantable implant of Embodiment 84-86, wherein the ratio of the first longitudinal length to the full longitudinal length is up to about 0.9.

106. The transplantable implant of Embodiment 84-86, wherein the ratio of the first longitudinal length to the full longitudinal length is up to about 0.8.

107. The transplantable implant of Embodiment 84-86, wherein the ratio of the first longitudinal length to the full longitudinal length is up to about 0.7.

108. The transplantable implant of Embodiment 84-86, wherein the ratio of the first longitudinal length to the full longitudinal length is up to about 0.68.

109. The transplantable implant of Embodiment 84-86, wherein the ratio of the first longitudinal length to the full longitudinal length is from about 0.3 to about 1.

110. The transplantable implant of Embodiment 84-86, wherein the ratio of the first longitudinal length to the full longitudinal length is from about 0.33 to about 0.95.

111. The transplantable implant of Embodiment 84-86, wherein the ratio of the first longitudinal length to the full longitudinal length is from about 0.35 to about 0.9.

112. The transplantable implant of Embodiment 84-86, wherein the ratio of the first longitudinal length to the full longitudinal length is from about 0.35 to about 0.8.

113. The transplantable implant of Embodiment 84-86, wherein the ratio of the first longitudinal length to the full longitudinal length is from about 0.37 to about 0.8.

114. The transplantable implant of Embodiment 84-86, wherein the ratio of the first longitudinal length to the full longitudinal length is from about 0.4 to about 0.8.

115. The transplantable implant of Embodiment 84-86, wherein the ratio of the first longitudinal length to the full longitudinal length is from about 0.42 to about 0.8.

116. The transplantable implant of Embodiment 84-86, wherein the ratio of the first longitudinal length to the full longitudinal length is from about 0.45 to about 0.8.

117. The transplantable implant of Embodiment 84-86, wherein the ratio of the first longitudinal length to the full longitudinal length is from about 0.45 to about 0.7.

118. The transplantable implant of Embodiment 84-86, wherein the ratio of the first longitudinal length to the full longitudinal length is from about 0.48 to about 0.8.

119. The transplantable implant of Embodiment 84-86, wherein the ratio of the first longitudinal length to the full longitudinal length is from about 0.5 to about 0.7.

120-1. The transplantable implant of Embodiment 85-119, wherein the full longitudinal length is about 12 mm or less.

120-2. The transplantable implant of Embodiment 85-119, wherein the full longitudinal length is about 11 mm or less.

120-3. The transplantable implant of Embodiment 85-119, wherein the full longitudinal length is about 10 mm or less.

120-4. The transplantable implant of Embodiment 85-119, wherein the full longitudinal length is about 9 mm or less.

121. The transplantable implant of Embodiment 85-119, wherein the full longitudinal length is about 8.5 mm or less.

122. The transplantable implant of Embodiment 85-119, wherein the full longitudinal length is about 8.0 mm or less.

123. The transplantable implant of Embodiment 85-119, wherein the full longitudinal length is about 7.5 mm or less.

124. The transplantable implant of Embodiment 85-119, wherein the full longitudinal length is about 7.0 mm or less.

125. The transplantable implant of Embodiment 85-119, wherein the full longitudinal length is about 6.5 mm or less.

126. The transplantable implant of Embodiment 85-119, wherein the full longitudinal length is about 6.0 mm or less.

127. The transplantable implant of Embodiment 85-119, wherein the full longitudinal length is about 5.5 mm or less.

128. The transplantable implant of Embodiment 85-119, wherein the full longitudinal length is about 5.2 mm or less.

129. The transplantable implant of Embodiment 85-119, wherein the full longitudinal length is about 5.0 mm or less.

130. The transplantable implant of Embodiment 85-119, wherein the full longitudinal length is about 4.8 mm or less.

131. The transplantable implant of Embodiment 85-119, wherein the full longitudinal length is about 4.7 mm or less.

132. The transplantable implant of Embodiment 85-119, wherein the full longitudinal length is about 4.6 mm or less.

133. The transplantable implant of Embodiment 85-119, wherein the full longitudinal length is about 4.5 mm or less.

134. A transplantable implant comprising:
a biocompatible scaffold configured to be degraded over time when implanted to cartilage of a patient, the biocompatible scaffold comprising a plurality of pores;
a plurality of chondrocytes incorporated into the scaffold, wherein the implant has a full longitudinal length to be implanted to an implantation hole created on the cartilage, wherein the implantation hole has an implantation depth, wherein the implant along the full longitudinal length has a first longitudinal length corresponding to the cartilage portion in the implantation hole along the implantation depth and optionally a second longitudinal length corresponding to a mineral bone portion in the implantation hole along the implantation depth when the implant is implanted to the implantation hole, wherein the ratio of the first longitudinal length to the full longitudinal length is at least about 0.3.

135. The transplantable implant of Embodiment 134, wherein the ratio of the first longitudinal length to the full longitudinal length is at least about 0.33.

136. The transplantable implant of Embodiment 134, wherein the ratio of the first longitudinal length to the full longitudinal length is at least about 0.35.

137. The transplantable implant of Embodiment 134, wherein the ratio of the first longitudinal length to the full longitudinal length is at least about 0.4.

138. The transplantable implant of Embodiment 134, wherein the ratio of the first longitudinal length to the full longitudinal length is at least about 0.5.

139. The transplantable implant of Embodiment 134, wherein the ratio of the first longitudinal length to the full longitudinal length is at least about 0.55.

140. The transplantable implant of Embodiment 134, wherein the ratio of the first longitudinal length to the full longitudinal length is at least about 0.6.

141. The transplantable implant of Embodiment 134, wherein the ratio of the first longitudinal length to the full longitudinal length is at least about 0.62.

142. The transplantable implant of Embodiment 134, wherein the ratio of the first longitudinal length to the full longitudinal length is at least about 0.64.

143. The transplantable implant of Embodiment 134, wherein the ratio of the first longitudinal length to the full longitudinal length is at least about 0.65.

144. The transplantable implant of Embodiment 134, wherein the ratio of the first longitudinal length to the full longitudinal length is at least about 0.66.

145. The transplantable implant of Embodiment 134, wherein the ratio of the first longitudinal length to the full longitudinal length is at least about 0.67.

146. The transplantable implant of Embodiment 134, wherein the ratio of the first longitudinal length to the full longitudinal length is at least about 0.68.

147. The transplantable implant of Embodiment 134, wherein the ratio of the first longitudinal length to the full longitudinal length is at least about 0.69.

148. The transplantable implant of Embodiment 134, wherein the ratio of the first longitudinal length to the full longitudinal length is at least about 0.7.

149. The transplantable implant of Embodiment 134, wherein the ratio of the first longitudinal length to the full longitudinal length is at least about 0.8.

150. The transplantable implant of Embodiment 134, wherein the ratio of the first longitudinal length to the full longitudinal length is at least about 0.9.

151. The transplantable implant of Embodiment 134, wherein the ratio of the first longitudinal length to the full longitudinal length is at least about 1.

152. The transplantable implant of Embodiment 134, wherein the ratio of the first longitudinal length to the full longitudinal length is up to about 1.

153. The transplantable implant of Embodiment 134, wherein the ratio of the first longitudinal length to the full longitudinal length is up to about 0.9.

154. The transplantable implant of Embodiment 134, wherein the ratio of the first longitudinal length to the full longitudinal length is up to about 0.8.

155. The transplantable implant of Embodiment 134, wherein the ratio of the first longitudinal length to the full longitudinal length is up to about 0.7.

156. The transplantable implant of Embodiment 134, wherein the ratio of the first longitudinal length to the full longitudinal length is from about 0.3 to about 1.

157. The transplantable implant of Embodiment 134, wherein the ratio of the first longitudinal length to the full longitudinal length is from about 0.33 to about 0.95.

158. The transplantable implant of Embodiment 134, wherein the ratio of the first longitudinal length to the full longitudinal length is from about 0.35 to about 0.9.

159. The transplantable implant of Embodiment 134, wherein the ratio of the first longitudinal length to the full longitudinal length is from about 0.35 to about 0.8.

160. The transplantable implant of Embodiment 134, wherein the ratio of the first longitudinal length to the full longitudinal length is from about 0.37 to about 0.8.

161. The transplantable implant of Embodiment 134, wherein the ratio of the first longitudinal length to the full longitudinal length is from about 0.4 to about 0.8.

162. The transplantable implant of Embodiment 134, wherein the ratio of the first longitudinal length to the full longitudinal length is from about 0.42 to about 0.8.

163. The transplantable implant of Embodiment 134, wherein the ratio of the first longitudinal length to the full longitudinal length is from about 0.45 to about 0.8.

164. The transplantable implant of Embodiment 134, wherein the ratio of the first longitudinal length to the full longitudinal length is from about 0.45 to about 0.7.

165. The transplantable implant of Embodiment 134, wherein the ratio of the first longitudinal length to the full longitudinal length is from about 0.48 to about 0.8.

166. The transplantable implant of Embodiment 134, wherein the ratio of the first longitudinal length to the full longitudinal length is from about 0.5 to about 0.7.

167. A transplantable implant comprising:
a biocompatible scaffold configured to be degraded over time when implanted to cartilage of a patient, the biocompatible scaffold comprising a plurality of pores;
a plurality of chondrocytes incorporated into the scaffold, wherein the implant has a full longitudinal length to be implanted to an implantation hole created on the cartilage, wherein the full longitudinal length is about 10 mm or less.

168. The transplantable implant of Embodiment 167, wherein the full longitudinal length is about 9 mm or less.

169. The transplantable implant of Embodiment 167, wherein the full longitudinal length is about 8.5 mm or less, optionally less than 8.5 mm.

170. The transplantable implant of Embodiment 167, wherein the full longitudinal length is about 8 mm or less.

171. The transplantable implant of Embodiment 167, wherein the full longitudinal length is about 7.5 mm or less.

172. The transplantable implant of Embodiment 167, wherein the full longitudinal length is about 7.0 mm or less.

173. The transplantable implant of Embodiment 167, wherein the full longitudinal length is about 6.5 mm or less.

174. The transplantable implant of Embodiment 167, wherein the full longitudinal length is about 6.0 mm or less.

175. The transplantable implant of Embodiment 167, wherein the full longitudinal length is about 5.5 mm or less.

176. The transplantable implant of Embodiment 167, wherein the full longitudinal length is about 5.2 mm or less.

177. The transplantable implant of Embodiment 167, wherein the full longitudinal length is about 5.0 mm or less.

178. The transplantable implant of Embodiment 167, wherein the full longitudinal length is about 4.8 mm or less.

179. The transplantable implant of Embodiment 167, wherein the full longitudinal length is about 4.7 mm or less.

180. The transplantable implant of Embodiment 167, wherein the full longitudinal length is about 4.6 mm or less.

181. The transplantable implant of Embodiment 167, wherein the full longitudinal length is about 4.5 mm or less.

182. The transplantable implant of Embodiment 1-181, wherein the biocompatible scaffold has the full longitudinal length longer than a cartilage thickness of the cartilage.

183. The transplantable implant of Embodiment 1-182, wherein the biocompatible scaffold has the longitudinal length longer than the implantation depth.

184. the transplantable implant of Embodiment 1-183, wherein the patient is an animal.

185. the transplantable implant of Embodiment 1-183, wherein the patient is a human.

186. the transplantable implant of Embodiment 1-185, wherein the biocompatible scaffold has at least about 65% porosity.

187. the transplantable implant of Embodiment 1-185, wherein the biocompatible scaffold has at least about 70% porosity.

188. the transplantable implant of Embodiment 1-185, wherein the biocompatible scaffold has at least about 75% porosity.

189. the transplantable implant of Embodiment 1-185, wherein the biocompatible scaffold has at least about 80% porosity.

190. the transplantable implant of Embodiment 1-185, wherein the biocompatible scaffold has at least about 85% porosity.

191. the transplantable implant of Embodiment 1-185, wherein the biocompatible scaffold has at least about 88% porosity.

192. the transplantable implant of Embodiment 1-191, wherein an average size of the plurality of pores is from about 100 µm to about 700 µm.

193. the transplantable implant of Embodiment 1-191, wherein an average size of the plurality of pores is from about 150 µm to about 650 µm.

194. the transplantable implant of Embodiment 1-191, wherein an average size of the plurality of pores is from about 200 µm to about 600 µm.

195. the transplantable implant of Embodiment 1-191, wherein an average size of the plurality of pores is from about 200 µm to about 550 µm.

196. the transplantable implant of Embodiment 1-191, wherein an average size of the plurality of pores is from about 200 µm to about 500 µm.

197. the transplantable implant of Embodiment 1-191, wherein an average size of the plurality of pores is from about 225 µm to about 450 µm.

198. the transplantable implant of Embodiment 1-191, wherein an average size of the plurality of pores is from about 250 µm to about 400 µm.

199. the transplantable implant of Embodiment 1-198, wherein the plurality of chondrocytes includes a plurality of autologous chondrocytes.

200. the transplantable implant of Embodiment 1-199, wherein the biocompatible scaffold includes poly-L-lactic-co-glycolic acid (PLGA).

201. the transplantable implant of Embodiment 1-200, wherein the biocompatible scaffold includes tricalcium phosphate (TCP).

NON-LIMITING EXAMPLES

The following examples can be provided to illustrate selected embodiments. They should not be considered as limiting the scope of the invention, but merely as being illustrative and representative thereof. Thus, the examples provided below, while illustrated with a particular medical device or active agent, can be applicable to the range of medical devices and active agents described herein.

Example 1: Animal Experimental and Surgical Procedures

Figure 1B:
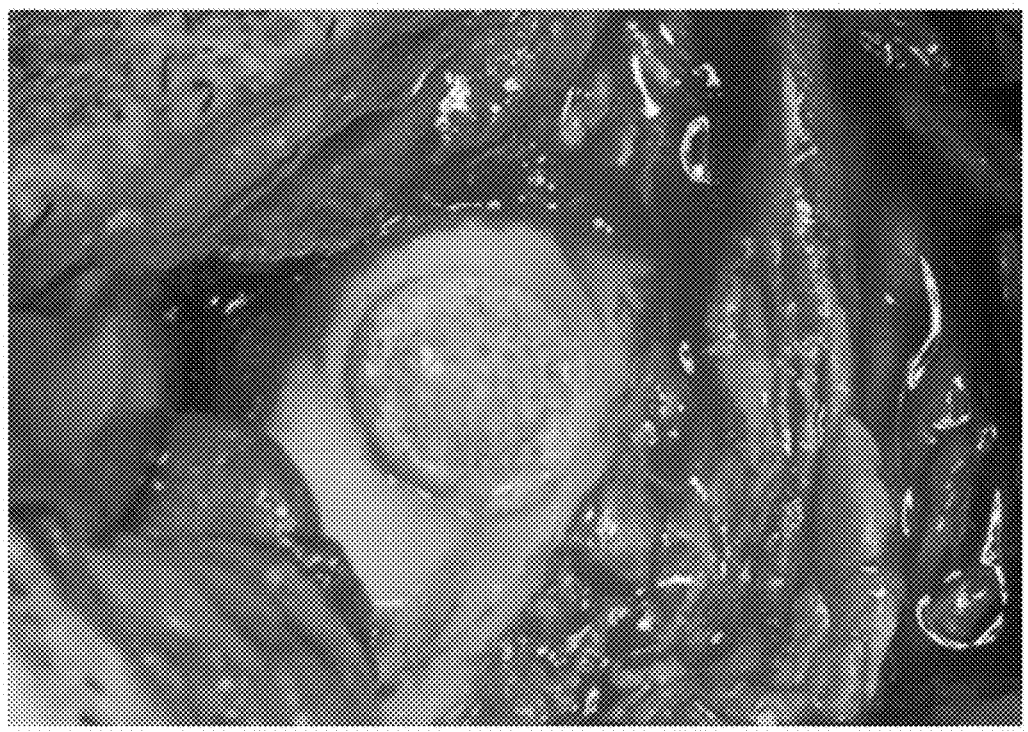
FIG. 1B shows the implant surgery site where the trimmed plug was inserted into the defect flush with the articular surface as the test group in some embodiments.
Figure 2A:
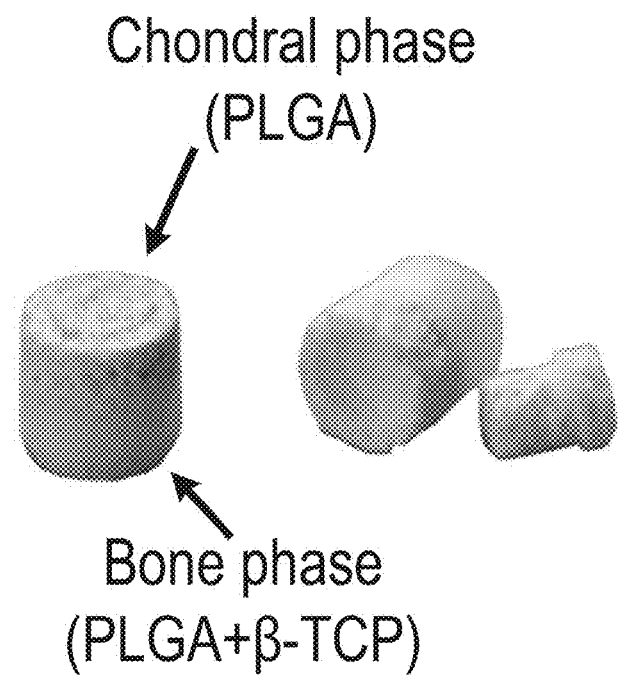
FIG. 2A shows an untrimmed plug for a trimmed plug preparation method in some embodiments.
Figure 2B:
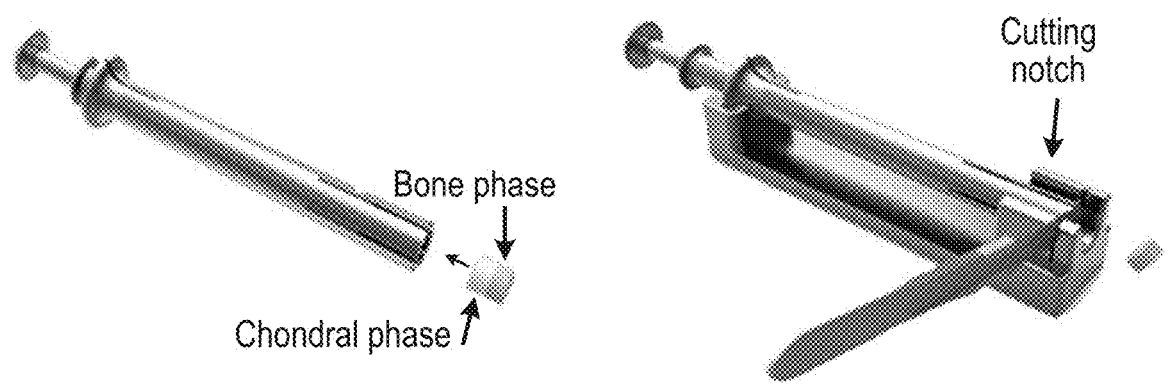
FIG. 2B shows an example trimming device for a trimmed plug preparation method in some embodiments.
Figure 2C:
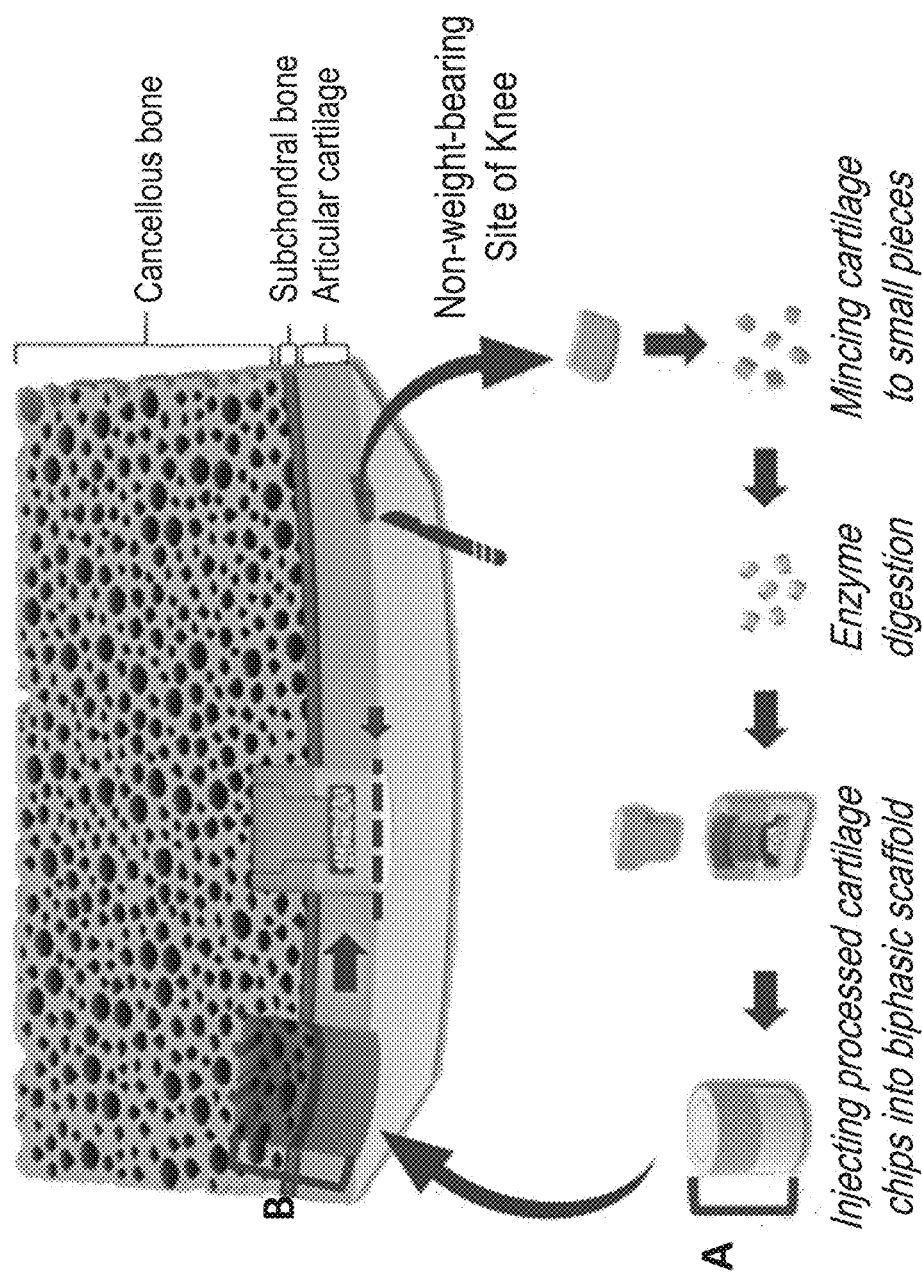
FIG. 2C shows an example structure and process of preparing and implanting an example transplantable implant according to at least some aspect of the present disclosure in some embodiments.

Animal experimentation was conducted according to a protocol approved by the Institutional Animal Experiment Committee (Pig model Animal Technology Co., Ltd.). A total number of four adult Lanyu minpigs were selected into this study. All operations were performed in the operating room of the veterinary hospital using standard surgical procedures and aseptic technique. General anesthesia was induced and maintained by Isoflurane via inhalation after preanesthetic adjuvant administration firstly, including atropine, Xylazine and Zoletil 50 via muscular injection. The same arthrotomy was performed on the right unilateral caudal limb knee joints of each animal through a parapatellar longitudinal medial incision and lateral patellar dislocation. A circle with a diameter of 8.5 mm was marked in the center of the weight-bearing part of the distal femoral condyle. The marked full-thickness cartilage was stripped, and then the chondrocytes were isolated for the trimmed plug production. The production process of the autogenous chondrocyte-loaded trimmed plugs was described later. FIG. 1A shows implant surgery site with osteochondral defect, 8.5 mm in diameter and 4.5 mm in depth, created by drilling on the center of the load-bearing portion of the distal femoral condyle surface in some embodiments. FIG. 1B shows the implant surgery site where the trimmed plug was inserted into the defect flush with the articular surface as the test group in some embodiments. FIG. 2A shows an untrimmed plug for a trimmed plug preparation method (CHONDROPLUG™ biphasic cartilage and bone implants) in some embodiments. FIG. 2B shows an example trimming device for a trimmed plug preparation method in some embodiments. FIG. 2C shows an example structure and process of preparing and implanting an example transplantable implant according to at least some aspect of the present disclosure in some embodiments. Referring to FIG. 1A, each marked area was then drilled to an 8.5 mm diameter and 4.5 mm depth defect. Using the type of the plug and the device from FIGS. 2A-2C, after the defect created, the sterilized and autogenous chondrocyte-loaded 4.5 mm trimmed plug were inserted into the defect as test group (animals #133 and #135 as the trimmed plug group), whereas the control group without any implantation (animals #119 and #129 as the empty hole group). All animals were sacrificed after 12 months of care, and samples were collected for histochemical and immunohistochemical staining and mechanical testing.

Example 2: Trimmed Plug Preparation

Trimmed plugs were modified from the implants of the "RevoCart®" One-Step Autologous Cartilage Repair System (3RC002M) purchased from BioGend Therapeutics Co., Ltd. (Taiwan). This system includes the "CHONDROPLUG™" biphasic cartilage and bone implants, the "AccuCut®" tissue processor, enzymes, and enzyme-specific solutions. CHONDROPLUG™ is a biphase cylindrical implant with 85% porosity, 250-400 µm pore size, 8.5 mm diameter, and 8.5 mm height (FIG. 2A). The enzyme is a mixture of Type I (2.2-3.4 mg) and Type II (1.5-2.3 mg) collagenase. The enzyme-specific solution consists of $H_2O$ with an osmolarity of 287±15 mOsm/kg and pH 7.1-7.4 as the datasheet shows.

Before getting trimmed plugs, the autologous chondrocyte-loaded CHONDROPLUG™ implants needed to be firstly prepared. Briefly, referring to FIG. 2C, autologous full-thickness cartilages were obtained from the experimental animal as described above, and the chondrocytes were following isolated via the accessories of the RevoCart® according to the operating manual. After harvesting autologous chondrocytes, these cells are injected via a sterile syringe into the chondral phase of the CHONDROPLUG™ to become the final biphasic cartilage and bone implant. Then, the CHONDROPLUG™ implant seeded with autologous chondrocytes was placed into a homemade trimming device, as shown in FIG. 2B. This trimming device at least comprises a cylindrical notch (8.5 mm diameter and 4.5 mm depth) and a trimming blade. During the trimmed process, the chondral phase of the CHONDROPLUG™ implant was placed inside of the cylindrical notch, while the bone phase would expose outside of the notch (about 4 mm height). The trimming blade was used to cut and remove the exposed bone phase part of the CHONDROPLUG™ implant, and the trimmed CHONDROPLUG™ implant would be regarded as the trimmed plug in this study.

Example 3: Bioimaging

Cartilage defects were followed at 1, 6, and 12 months using a 128-slice computed tomography (CT; Ingenuity CT, Koninklijke Philips N.V.) scanner and at 12 months using a 3.0T magnetic resonance (MR; Achieva 3.0T, Koninklijke Philips N.V.) imager after surgery. Before bioimaging, the animals were sedated by midazolam and ketamine, and anesthetized with inhaled oxygen and isoflurane. Animals were positioned in sternal recumbency on the CT or MR cradle with hind limbs extended. During CT imaging, the hind limbs were scanned with a source voltage of 120 kV, an X-ray tube current of 358 mA and a slice thickness of 1 mm. On the other hand, a coil for human bodies was attached around the right caudal limb knee joints during the MR scan, which was scanned with T1-weighted (T1W) and T2-weighted (T2W) sequences. The bone fraction (bone volume/total volume, BV/TV) of osteochondral defects were calculated from coronal CT images by commercial imageJ software (plug-in BoneJ). All measurements were shown from at least 3 independent calculations. Statistical significance was determined using one-way analysis of variance followed by Duncan's test. P value of <0.01 was considered significant.

Example 4: Histological Staining and Scoring

During necropsy, the articular specimens were harvested and preserved in 10% neutral buffered formalin (NBF) for 24-48 hours, then submitted for decalcification in OSTEOSOFT® (Merck, USA) solution at 4° C. for consecutive weeks until further tissue trimming, gradient EtOH dehydration, Xylene, paraffin embedding, and microtome section. Then, these slides were stained with hematoxylin and eosin (H&E), Alcian blue, Safranin O/Fast green, and Movat pentachrome to detect histological response and cartilage regeneration by board-certified toxicopathologist.

The primary area of interest (ROI) was aimed on the articular cartilage integrity in iatrogenic created defect after implant device involvement. According to the reference published in Arthritis Rheumatol and in Osteoarthritis Cartilage, the modified grading system was present in Table1. Table 1 show a summary of histological scoring or grading in some embodiments.

TABLE 1

Histological Grading

| Category, subcategory | Score |
|---|---|
| Articular cartilage structure | |
| Normal, smooth, uninterrupted surface | 0 |
| Mild surface irregularities (undulations) | 1 |
| Irregular surface, 1-3 superficial clefts (fissures) | 2 |
| >3 fissures and/or loss of cartilage in the superficial zone | 3 |
| 1-3 fissures extending into the middle zone | 4 |
| >3 fissures and/or loss of cartilage extending into the middle zone | 5 |
| 1-3 fissures extending into the deep zone | 6 |
| >3 fissures extending into the deep zone and/or loss of cartilage to deep zone | 7 |
| Fissures or loss of cartilage extending to the zone of calcified cartilage | 8 |
| Chondrocyte cellularity | |
| Normal (1~2 cells/lacuna) | 0 |
| Diffuse/slight hypercellularity | 1 |
| Regions of hypercellularity and clustering | 2 |
| Diffuse hypocellularity | 3 |
| Tidemark integrity | |
| Intact/single tide mark | 0 |
| Crossed by blood vessels/duplication of tidemark | 1 |
| Osteophyte | |
| No osteophyte present | 0 |
| Small osteophyte | 1 |
| Medium-sized osteophyte | 2 |
| Large osteophyte | 3 |

The second ROI was focus on the articular cartilage recovery according to the reference published on The Open Rheumatology journal for Safranin-O and Alcian blue staining as in Table 2. Table 2 shows histological analyses of proteoglycans.

TABLE 2

Histological Analyses of Proteoglycans

| Category, subcategory | Score |
|---|---|
| Safranin O and Alcian blue stain | |

TABLE 2-continued

Histological Analyses of Proteoglycans

| Category, subcategory | Score |
|---|---|
| Minimal orange-red and blue staining | 0 |
| Very weak orange-red or blue staining | 1 |
| Weak orange-red or blue staining | 2 |
| Moderate orange-red or blue staining | 3 |
| Strong orange-red or blue staining | 4 |
| Very strong orange-red or blue staining | 5 |

Example 5: Immunohistochemical Staining and Scoring

The articular microtome sections were processed with the same as histological staining groups. The slides were then stained with IHC stain (anti-collagen I and anti-collagen II) to detect immunohistochemical response and cartilage regeneration by board-certified toxicopathologist. The third ROI was targeted on collagen I and collagen II secretion from regenerated tissue to distinguish scar (collagen I) and cartilage matrix (collagen II). The antigen retrieving on rehydrated sections were executed through protease K digestion in humid chamber at 37° C. for 20 minutes, followed with primary antibody incubation (ab34710 as anti-collagen I and ab34712 as anti-collagen II at 10 g/mL, Abcam, USA) and labeled with second anti-rabbit IgG antibody HRP conjugated prior to DAB chromogen detection. According to the reference published in Osteoarthritis Cartilage, the 4-phase categorization was used (Table 3) to score for the results of immunohistochemical staining. Table 3 shows evaluation of collagen I and collagen II. Table 5. shows histopathologic scores from study animals.

TABLE 3

Evaluation of Collagen I and Collagen II.

| Grade | Color | Definition |
|---|---|---|
| 0 | None | Minimum amount of Type I or II collagen secretion of accumulation in cartilage matrix, barely identify through slides (No color ) |
| 1 | Weak brown | Sporadic brown pellet of Type I or II collagen, can be observed from the cartilage matrix. |
| 2 | Light brown | Segment of labeling Type I or II collagen can be notice within euulage matris. |
| 3 | Dark Brown | Maximum amount of Type I or II collagen of cartilage matrix. |

The overall score by the results of gross appearances, histochemical and immunohistochemical staining was aimed to assess the cartilage integrity with 6-phase categorizations (Table 4), which based on the reference from J Anim Plant Sci. For example, Table 4 summarizes example articular cartilage integrity categories.

TABLE 4

Articular Cartilage Integrity Categories.

| Stage | Description | Definition |
|---|---|---|
| I | Normal | 1. Intact surface layer |

TABLE 4-continued

Articular Cartilage Integrity Categories.

| Stage | Description | Definition |
|---|---|---|
| | cartilage | 2. Normal population of chondrocytes<br>3. Normal orientation of chondrocyte columns<br>4. Normal morphology of cells and continuous matrix |
| II | Rough surface | 1. Irregular superficial layer<br>2. Condensation of superficial layer<br>3. Proliferation of chondrocytes<br>4. Initiation of cluster formation |
| III | Surface discontinuity | 1. All above and discontinuous superficial layer<br>2. Cell death till mid zone and or hypercellularity<br>3. Disorientation of chondrocyte columns<br>4. Cluster formation |
| IV | Cleft formation | 1. All above and large patches of cell death<br>2. Sloughing of layers till mid zone<br>3. Mild loss of matrix and hypertrophy |
| V | Erosion | 1. Sloughing of cellular layers<br>2. Maximum loss of matrix<br>3. Clusters of chondrocytes, hypocellularity and multiple patches of cell death |
| VI | Denudation | 1. Denudation of bone<br>2. Maximum loss of cellular layers and matrix, micro fracture and initiation of fibrosis |

Example 6: Mechanical Compression Test

For the biomechanical characterization, the compressive strengths of the regenerated and nearby native cartilages were determined by an unconfined uni-axial test using a computer universal testing machine (HT-2402, Hung Ta Instrument Co., Ltd.). Before the biomechanical testing, the articular specimens were also preserved in 10% neutral buffered formalin (NBF) for at least 48 hours, and then trimmed into a cuboid with a length of 22 mm, a width of 20 mm, and a height of 30 mm. The trimmed specimens were mounted in homemade molds with acrylonitrile butadiene styrene (ABS) solution to ensure that the samples stood well. Initially, the upper loading unit of the universal testing machine was flush with the surface of the defect. The displacement speed was set at 10 mm/min, and the measurement was stopped when the displacement reached 8.5 mm.

Results

Bioimaging and Gross Appearance

Figure 3:
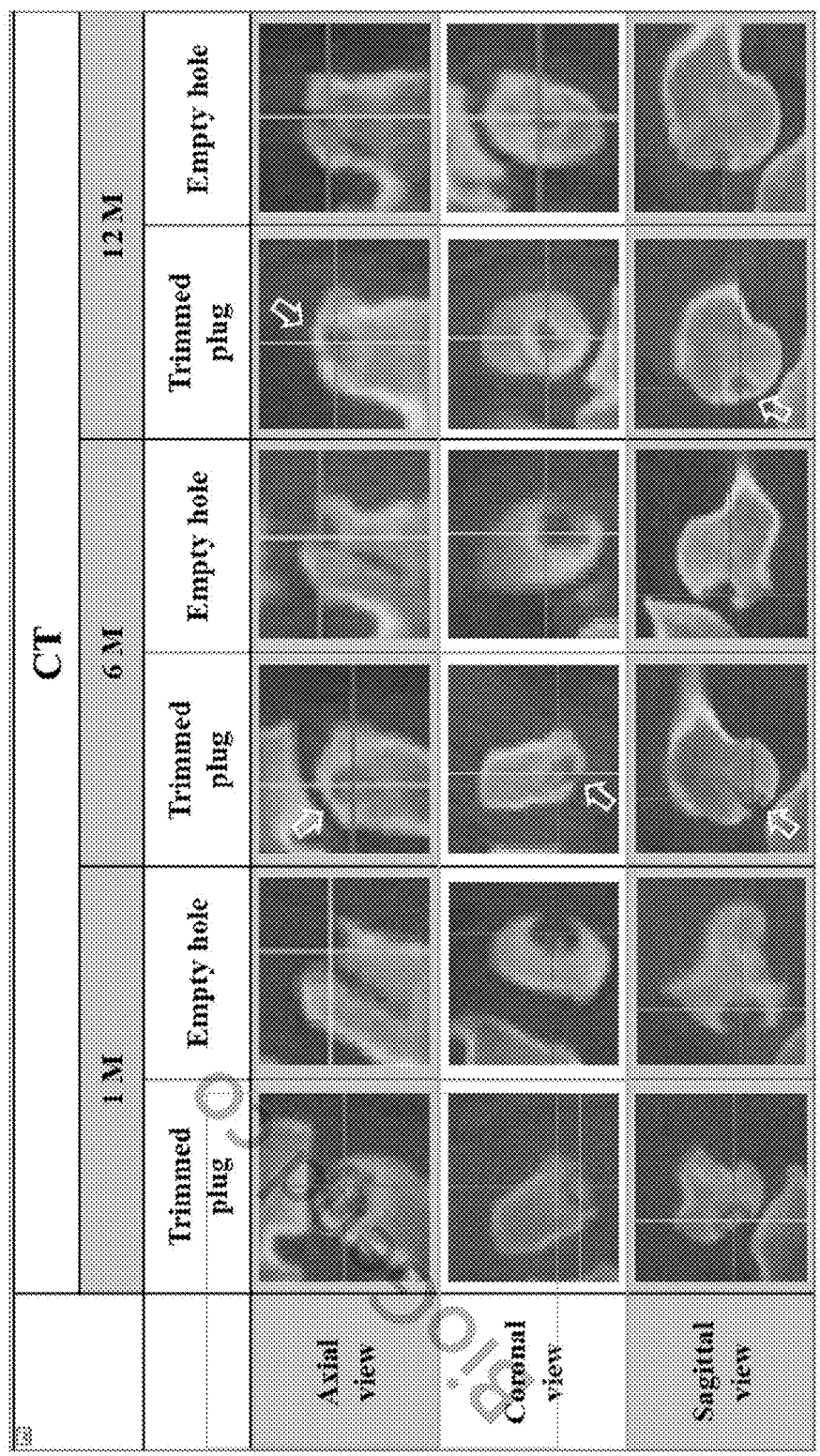
FIG. 3 illustrates computed tomography (CT) images of cartilage defects of the animals at 1,6 and 12 months after the operation in some embodiments.
Figure 4:
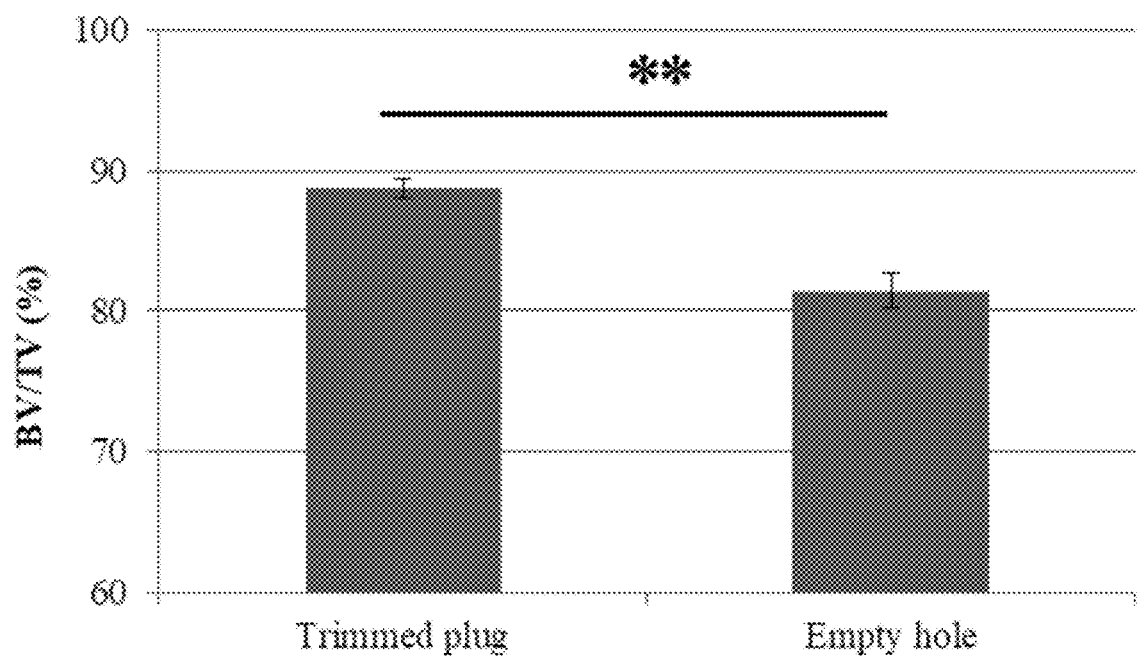
FIG. 4 shows the bone volume/total volume (BV/TV) ratio of the osteochondral defects of the 12-month CT images in some embodiments.
Figure 5:
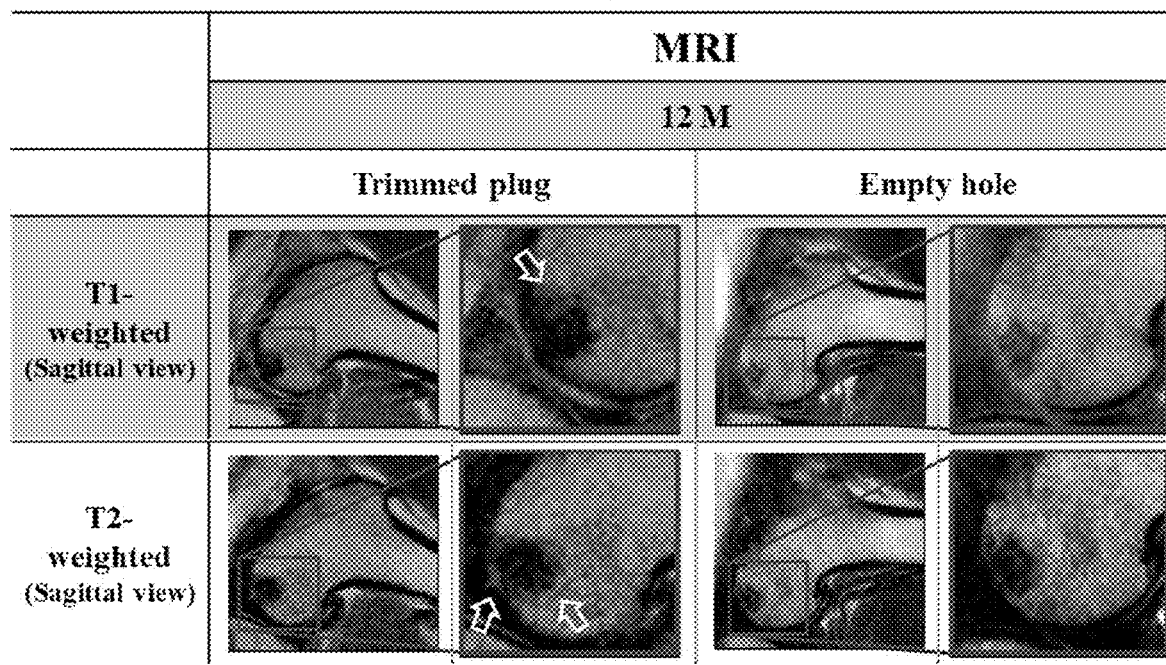
FIG. 5 shows Magnetic resonance (MR) images of cartilage defects of the animals at 12 months after the operation in some embodiments.
Figure 6A:
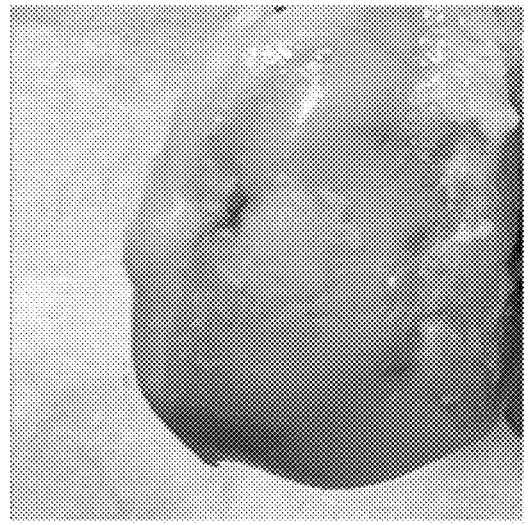
FIG. 6A shows gross appearances of cartilages of the animals after sacrifice from the trimmed plug group in some embodiments.
Figure 6B:
FIG. 6B shows gross appearances of cartilages of the animals after sacrifice from the empty hole group in some embodiments.

FIG. 3 illustrates computed tomography (CT) images of cartilage defects of the animals at 1,6 and 12 months after the operation in some embodiments. FIG. 4 shows the bone volume/total volume (BV/TV) ratio of the osteochondral defects of the 12-month CT images in some embodiments. FIG. 5 shows Magnetic resonance (MR) images of cartilage defects of the animals at 12 months after the operation in some embodiments. FIG. 6A shows gross appearances of cartilages of the animals after sacrifice from the trimmed plug group (animal #133) in some embodiments. FIG. 6B shows gross appearances of cartilages of the animals after sacrifice from the empty hole group (animal #119) in some embodiments.

To rule out individual differences and observe changes in each defect, CT scans were performed on each right hind limb of the animals at 1, 6, and 12 months after implantation, as shown in FIG. 3. At 1 month, the trimming plug was clearly visible and did not shift or fall off. Over time, the trimmed plug gradually shrunk and became invisible, and the implant within the defect was no longer visible at 12 months. Newborn tissue appeared on the defect surface of the knee, at the position of the original cartilage layer, in the axial and sagittal section of CT images of the trimmed plug group at 6 and 12 months after the operation. On the other hand, because there was no implant support, a deep fissure appeared in the mineral bone below the defect of the empty hole group, which could not heal even after feeding for 12 months. In addition, there was no suspected newborn tissue in the defect of the empty hole group. Twelve-month coronal CT images were used to calculate the bone density of repaired defects (See, e.g., FIG. 4). The BV/TV value of the trimmed plug group (88.80±1.41) was larger than that of the empty hole group (81.45±2.45), and there was a statistically significant difference between these two groups (P=<0.01).

The hind limbs of animals were also scanned using MRI at 12 months after implantation to further characterize the tissue (See, e.g., FIG. 5). Both the T1-weighted (T1W) and T2-weighted (T2W) MR images of the trimmed plug group show some bright parts were detected around the defect and the position of the cartilage layer, as the data from the CT images showed. For the empty hole group, a foggy view was observed in the T1W images but T2W images show a dark view inside the defect. In neither T1W nor T2W images, there were bright parts around the defect of the empty hole group. From the gross appearances of cartilage (See, e.g., FIG. 6), the cartilaginous surface created a smooth surface and a covered defect in the trimmed plug group. The tissue of the empty hole group was absent, and the defect could not be completely filled and covered even after 12 months of feeding.

Histological Staining and Scoring

Figure 7A:
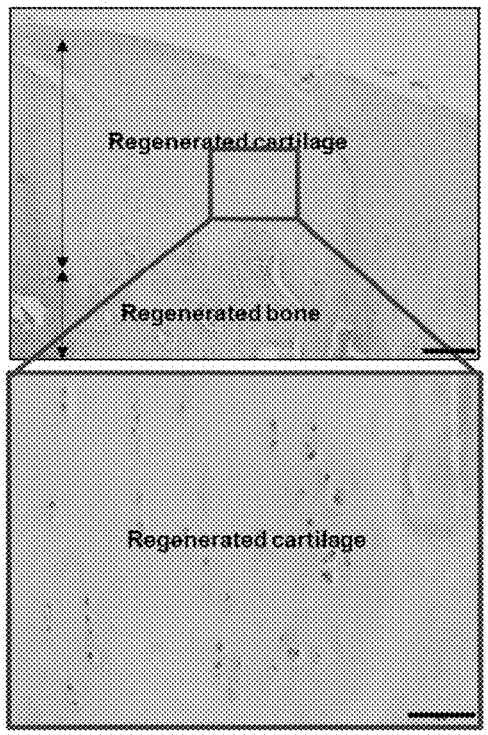
FIGS. 7A-7B show hematoxylin and eosin (H&E) staining of cartilage defects of the animals at 12 months after the operation from the trimmed plug group and from the empty hole group in some embodiments.
Figure 7B:
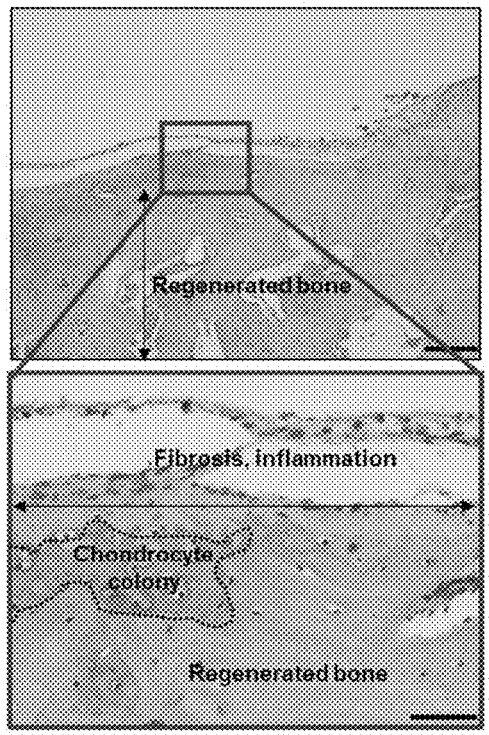

FIGS. 7A-7B shows hematoxylin and eosin (H&E)) staining of cartilage defects of the animals at 12 months after the operation from the trimmed plug group (FIG. 7A, animal #135) and from the empty hole group (FIG. 7B, animal #129) in some embodiments. The scale bar in the above FIGS. 7A-7B is equal to 200 μm, and that in the high-power view is 50 μm.

Figure 8A:
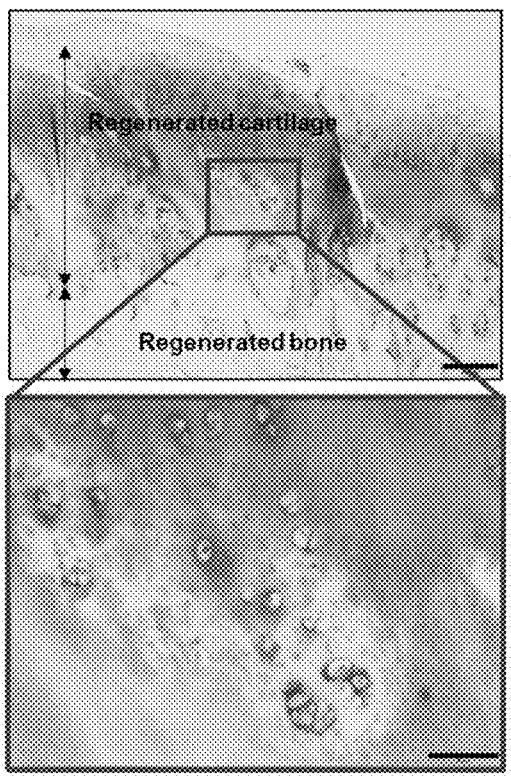
FIGS. 8A-8F show histological staining of cartilage defects of the animals at 12 months after the operation in some embodiments.
Figure 8B:
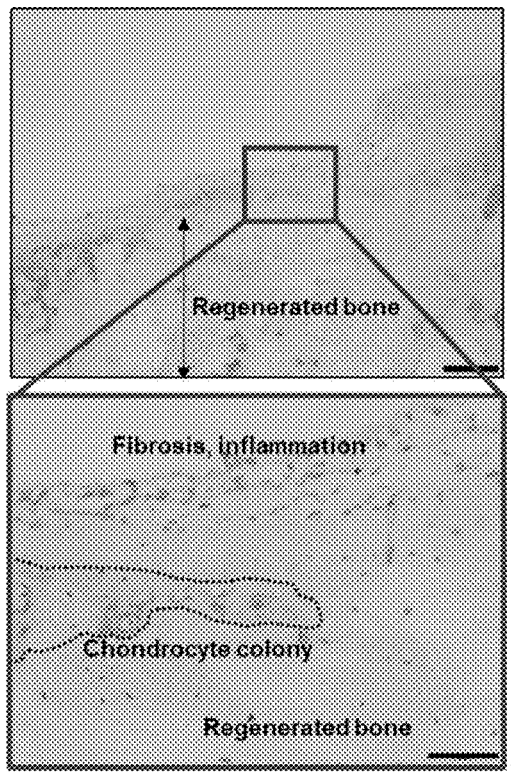
Figure 8C:
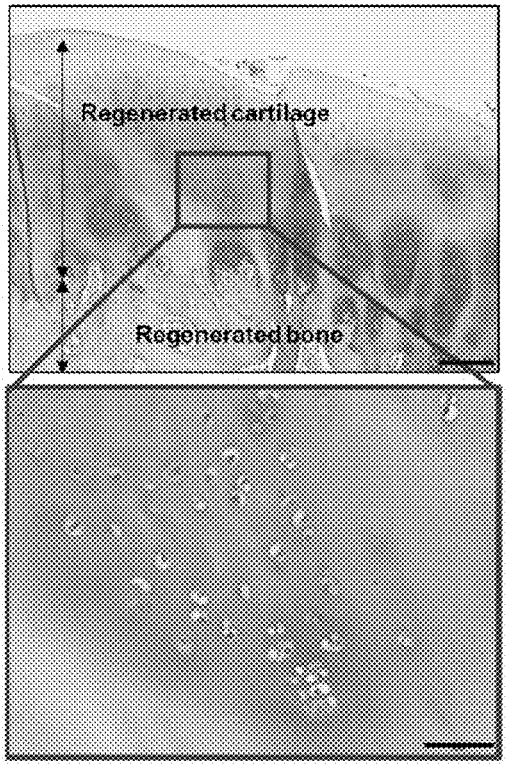
Figure 8D:
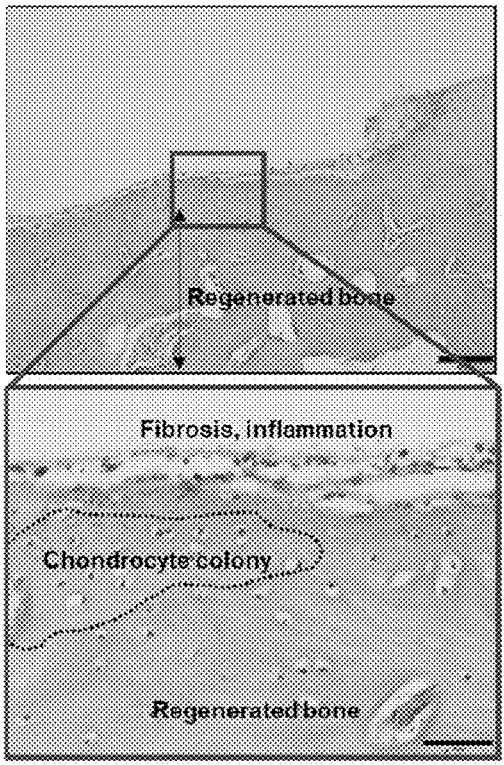
Figure 8E:
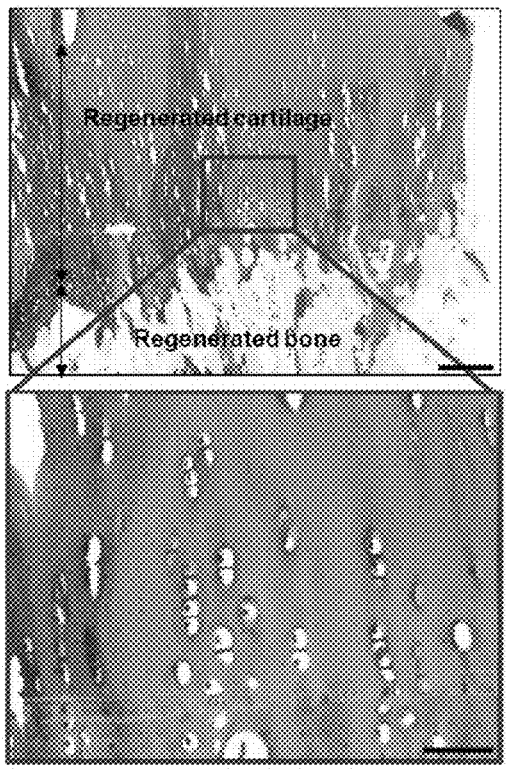
Figure 8F:
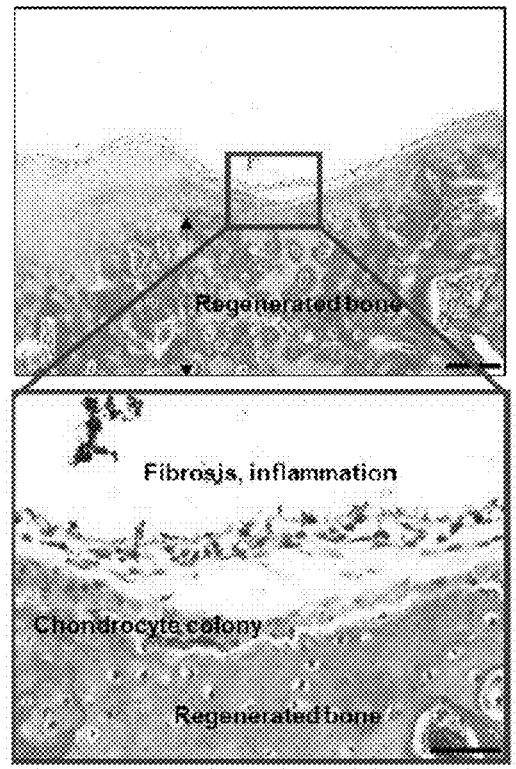

FIGS. 8A-8F shows histological staining of cartilage defects of the animals at 12 months after the operation, with FIGS. 8A-8B in Alcian blue staining in some embodiments; with FIGS. 8C-8D in safranin O staining; and FIGS. 8E-8F in Movat's pentachrome staining-FIGS. 8A, 8C, and 8E being of the trimmed plug group (animal #13)5 and FIGS. 8B, 8D, and 8F being of the empty hole group (animal #129). The scale bar in FIGS. 8A-8F is equal to 200 μm, and that in the high-power view is 50 μm.

In the articular cartilage assessment from histological staining images, the healing response was superb through diffuse cartilage matrix accumulation and chondrocyte regeneration with cellularity alteration in the trimmed plug group (See, e.g., FIG. 7A). In high power view, the defects healed without osteophyte or microfracture, which elucidates that the healing status was very similar to the normal cartilage. On the other hand, the sample from the empty hole group without any repairment unveiled significant regional cartilage loss and unhealed defect (See, e.g., FIG. 7B). In high power view, the regenerated chondrocytes were scattered between mineral bone and fibrous tissue with the inflammatory response and invasive into bone fissures. However, there was no mineral bone hyperplasia or abnormal fragmentation as osteophyte on the section from animals. Table 5. Shows histopathologic scores from study animals. The results of H&E staining were scored according to the definition of Table 1, with 1 point in the experimental group and 11 points in the control group (See, e.g., Table 5).

TABLE 5

Histopathologic Scores from Study Animals.

| Section ID | Trimmed plug | Empty hole |
|---|---|---|
| H&E stain[1] | | |
| Articular cartilage structure | 1 | 8 |
| Chondrocyte cellularity | 0 | 2 |
| Tidemark integrity | 0 | 1 |
| Osteophyte | 0 | 0 |
| Safranin O stain[2] | 4 | 0 |
| Alcian blue stain[2] | 3 | 1 |
| Collagen I[3] (Regenerated cartilage surface) | 0 | 1 |
| Collagen II[3] (Regenerated cartilage surface) | 2 | 1 |
| Degenerative articular cartilage categories[4] | I | VI |

[1]The score grading was based on Table 1;
[2]The score grading was based on Table 2;
[3]The score grading was based on Table 3;
[4]The score grading was based on Table 4.

Meanwhile, the sections also stained with Alcian blue, Safranin O, and Movat's pentachrome, typical stains to detect cartilage matrix intensity, to further evaluate the effect of the cartilage regeneration 17. Alcian blue stain acidic polysaccharides such as glycosaminoglycans in cartilages and other body structures, and Safranin O is used for the detection of cartilage, mucin, and mast cell granules. The Movat's pentachrome staining uses to analyze the detailed bone healing progressions. The tissues of the sections can distinguish as a compact structure in dark yellow, fibrous tissue in light yellow, cartilage tissue in green and newborn osteoids in red. In the trimmed plug group, these resected cartilage matrices from regenerated chondrocytes were functional with moderate to strong signal intensities in Alcian blue, Safranin O, and Movat's pentachrome staining (See, e.g., FIGS. 8A, 8C and 8E). The empty hole group showed poor results in cartilage regeneration and was rich in newborn osteoid. (See, e.g., FIGS. 8B, 8D and 8F) Because of the strong signal intensities of regenerated chondrocytes (Table 5), the trimmed plug group scored 7 points. The control group got 1 point according to the definition of Table 2.

Immunohistochemical Staining and Scoring

Figure 9A:
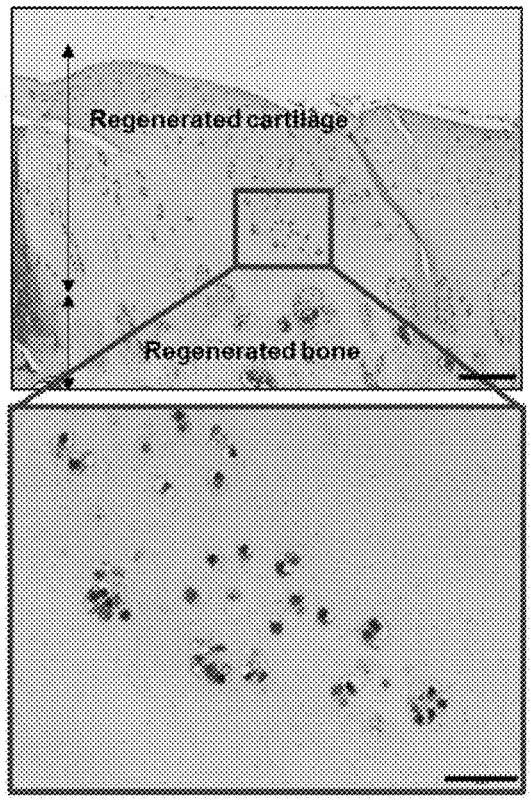
FIGS. 9A-9D show immunohistochemical staining of cartilage defects of the animals at 12 months after the operation in some embodiments.
Figure 9B:
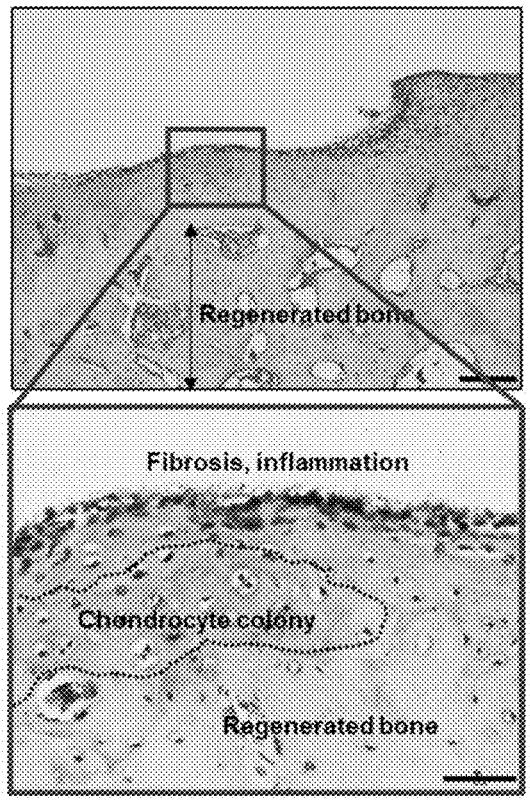
Figure 9C:
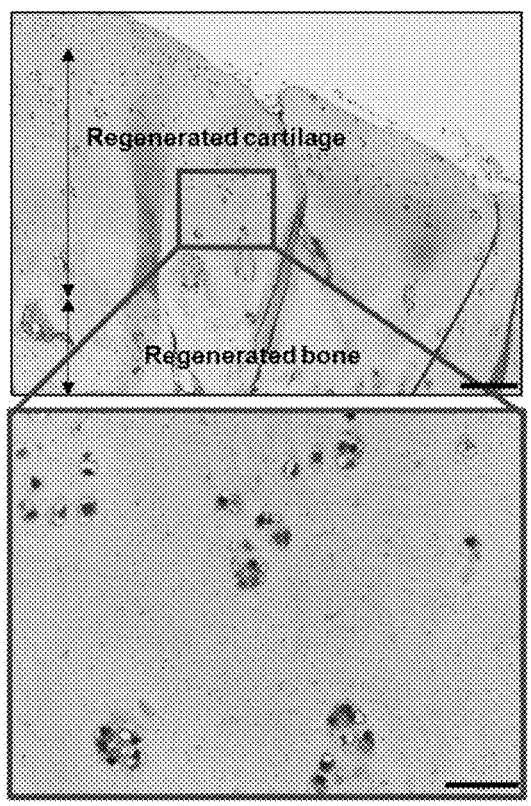
Figure 9D:
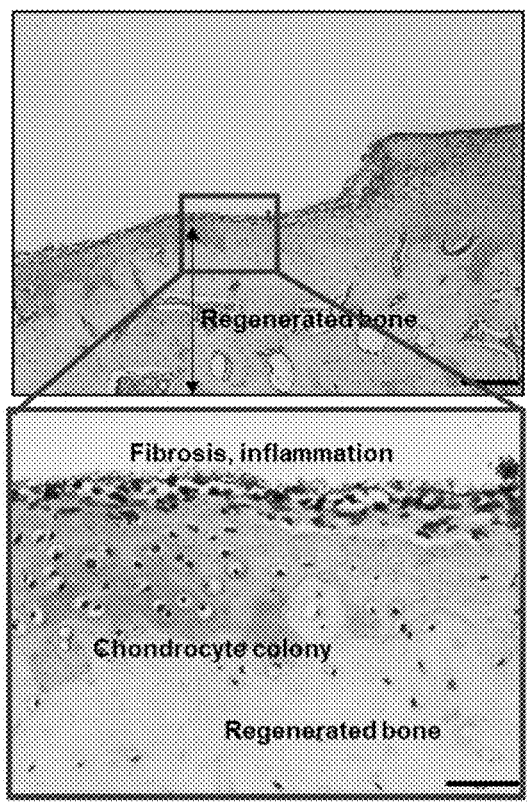

FIGS. 9A-9D shows immunohistochemical staining of cartilage defects of the animals at 12 months after the operation in some embodiments, with FIGS. 9A-9B with Collagen I stained; and FIGS. 9C-9D with Collagen II stained—FIGS. 8A and 8C from the trimmed plug group (animal #135) and FIGS. 8B and 8D from the empty hole group (animal #129). The scale bar in FIGS. 9A-9D is equal to 200 μm, and that in the high-power view is 50 μm.

Collagen I is rich in tendons, ligaments, the dermis, and the dentin, as well as in scar tissue, the product when tissue heals by repair. Collagen II is the basis for hyaline cartilage, which is main component of articular cartilage at joint surfaces. Therefore, anti-collagen I was used to mark fibrocartilage, and anti-collagen II was used to mark hyaline cartilage in immunohistochemical staining. The repaired cartilage in the trimmed plug group expressed strong signal intensity for collagen II and weak intensity for collagen I (See, e.g. FIGS. 9A and 9C), thus it received a score of 2 in the collagen II score (Table 5). The regenerated tissue in the control group showed slight signal intensity for both collagen II and collagen I (See, e.g., FIGS. 9B and 9D).

Overall, the observation of gross appearances, histological and immunohistochemical stain state that the regenerated tissue in the animal of the empty hole group was close to scar tissue. The articular cartilage was category VI from the animal, with the feature of maximum cellular layers and matrix loss. In contrast, the results indicate that the matrix was functional cartilage without any scar tissue in the animal of the trimmed plug group. Therefore, category I from articular cartilage assessment was made as normal cartilage with the feature of intact regenerated cartilage matrix (See, e.g., Table 5).

Mechanical Properties

Figure 10A:
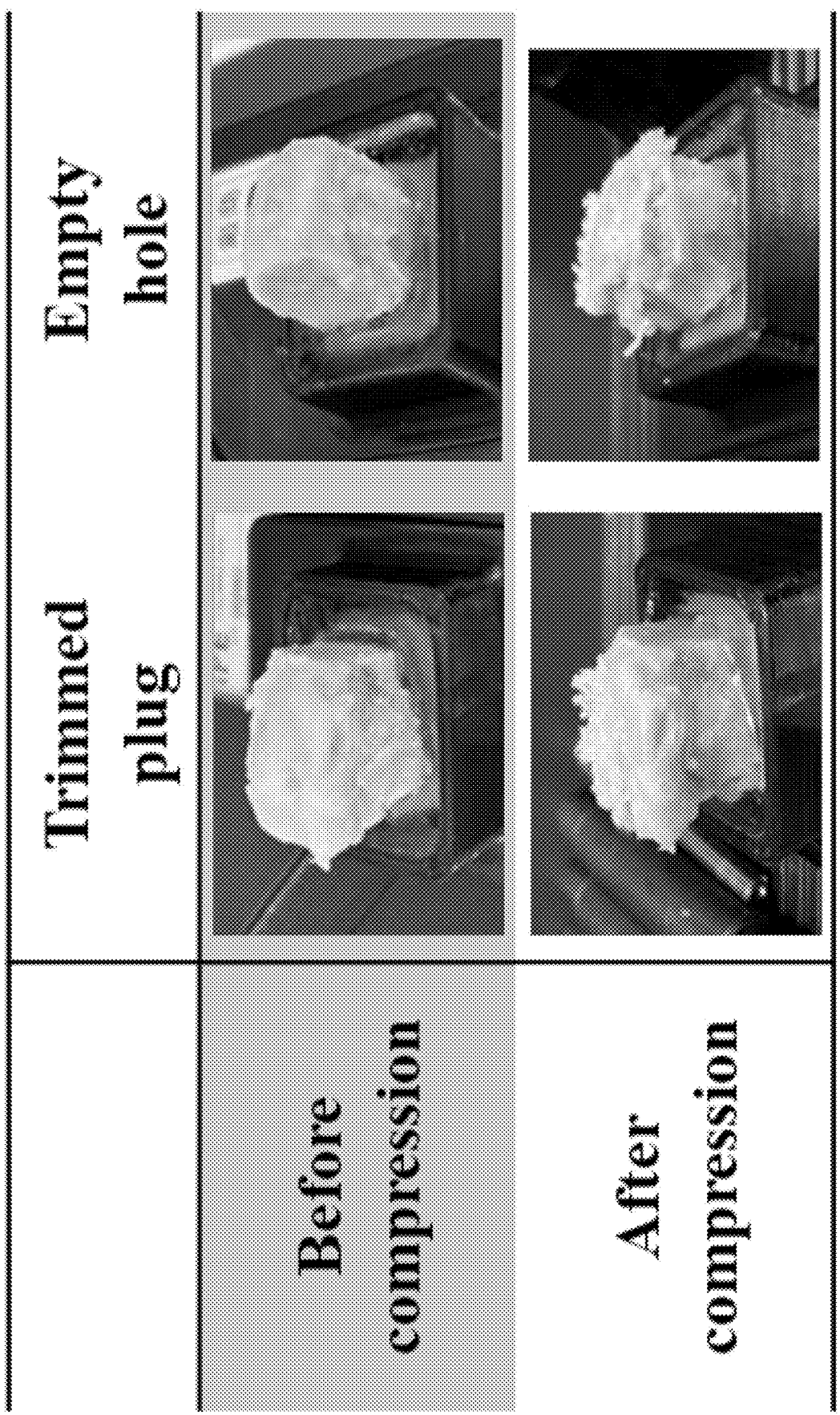
FIG. 10A shows gross appearances before and after compression of cartilage defects of the animals at 12 months after the operation in some embodiments.
Figure 10B:
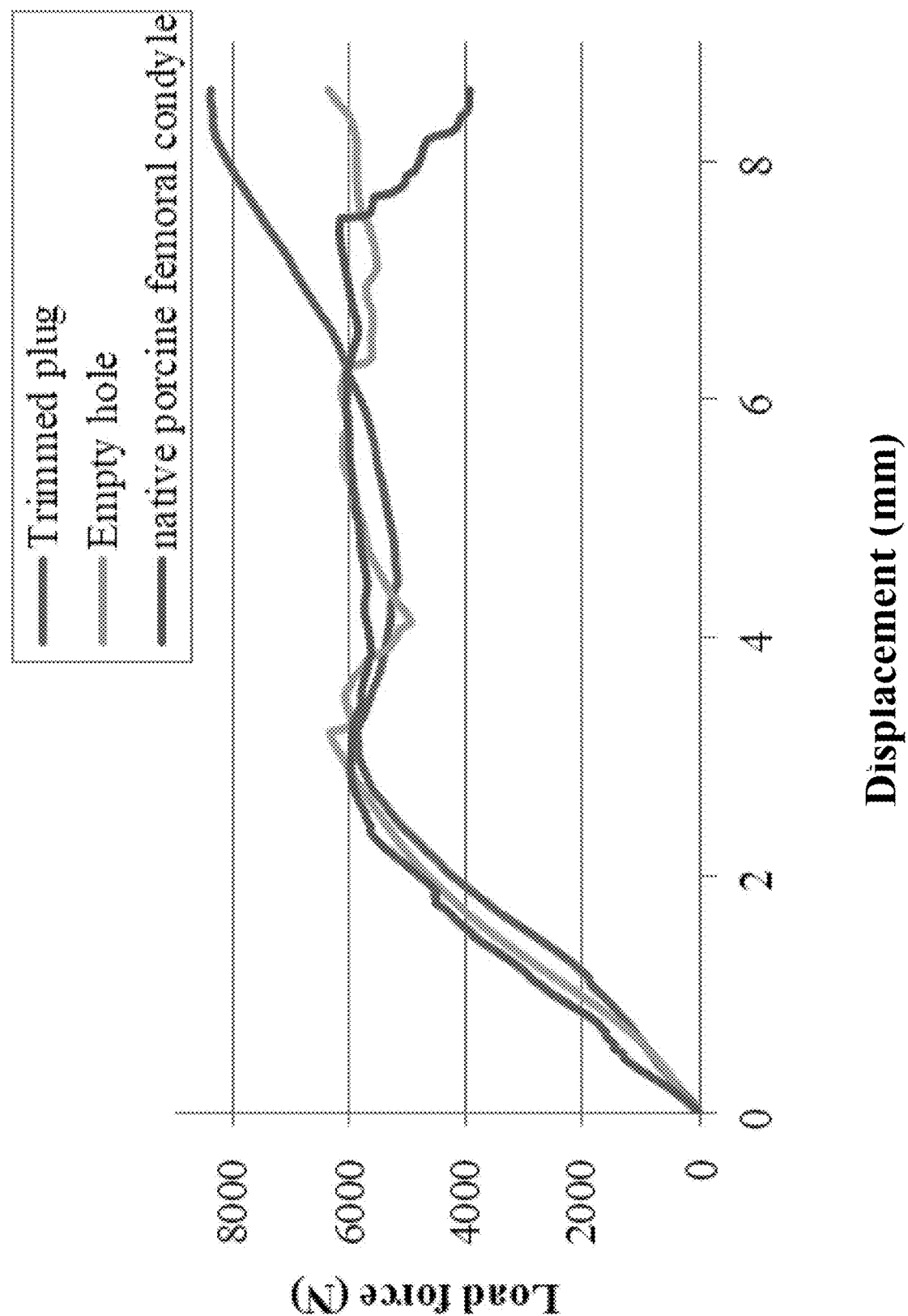
FIG. 10B shows Load Force-Displacement curves of cartilage defects of the animals at 12 months after the operation in some embodiments.
Figure 10C:
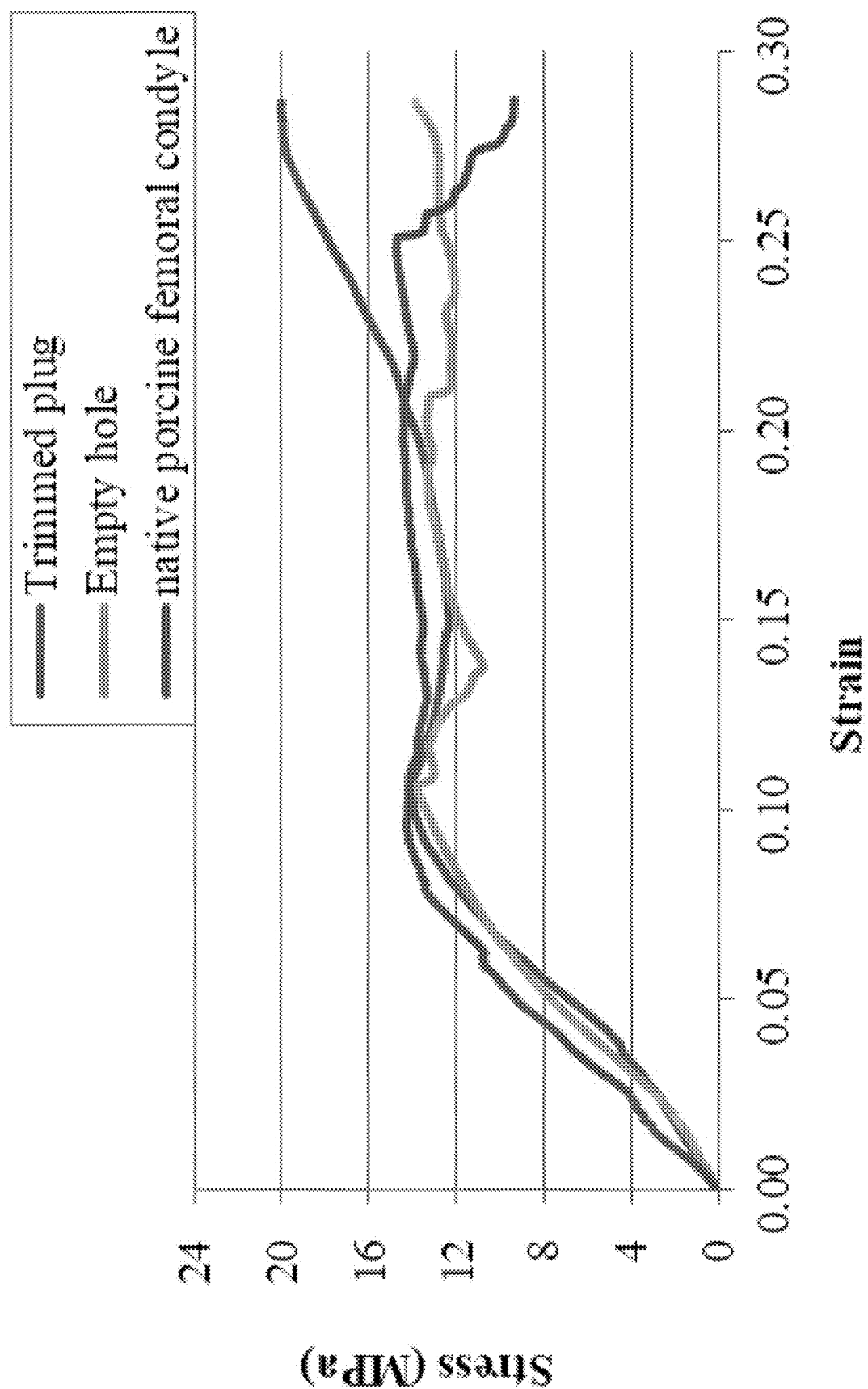
FIG. 10C shows Stress-Stain Curve of cartilage defects of the animals at 12 months after the operation in some embodiments.

FIG. 10A shows gross appearances before and after compression of cartilage defects of the animals at 12 months after the operation in some embodiments. FIG. 10B shows Load Force-Displacement curves of cartilage defects of the animals at 12 months after the operation in some embodiments. FIG. 10C shows Stress-Stain Curve of cartilage defects of the animals at 12 months after the operation in some embodiments. Examples shown in FIGS. 10A-10C are the right limb knee joints of animal #133 for the trimmed plug group and #119 for the empty hole group.

Compare with mineral bone, the cartilage layers were destroyed first after compression (See, e.g., FIG. 10A), and the samples of the empty hole group were more severely damaged than that of the trimmed plug group. Broken cartilage tissue remained on the contact area of the loading unit with defects in the trimmed plug group, but the nude mineral bone could be easily seen in the control group after the test.

In the compression test, the strength of both the experiment and control groups after 12 months showed similar results to that of native porcine femoral condyle (See, e.g., FIGS. 10B and 10C). When the displacement is less than 6 mm, the load force-displacement and stress-stain curves of each group are similar. However, when the displacement is greater than 6 mm (strain>0.2), the maximum load force and ultimate stress of the trimmed plug group were better than those in the control group, even better than the native porcine femoral condyle group. The elastic modulus of both the experiment and control groups was 0.156 GPa, which was slightly smaller than the native porcine femoral condyle (0.170 GPa) (See, e.g., Table 6).

Discussion

Previous studies have shown that the PLGA and TCP biodegradable polymer of CHONDROPLUG™ implant can repair mineral bones fissures occur because there is no scaffold to support the defect located in the weight bearing sites in the empty hole group. The bone marrow within mineral bone is a rich reservoir of stem cells that provides bone marrow stem cells for osteogenesis 18, as the TCP possesses good osteoconductivity properties, and the porous PLGA scaffold provides structural mechanical strength and space for osteoblast growth. As shown in FIG. 3, bone 20 so it does not need to provide an external cell source when using this implant. Therefore, the PLGA and TCP layer of the CHONDROPLUG™ implant is an excellent scaffold for mineral bone regeneration, osteoconductivity, and osseointegration.

In addition to get rid of the influence of the acidic environment to the cells at the defect site, we know that knee cartilage degeneration is more common in the elderly. A mineral bone with poor bone quality and weaker surrounding muscles difficulty provide support for its superficial cartilage, resulting in accelerated wear and tear of the cartilage on the contact and weight bearing sides. Moreover, since older osteoblasts proliferate at a lower rate than younger osteoblasts, damaged mineral bone tissue takes longer to repair in older patients compared to younger patients. The bone regeneration and integration ability of the mineral bone tissue in older patients is also weaker, so it is important to reduce the destruction of mineral bone when implanting. Trimmed CHONDROPLUG™ implants were studied in this study. CT images in FIG. 3, e.g., showed that the mineral bone layer of the trimmed plug group could heal within 6 months after implantation. While previous results with the CHONDROPLUG™ implant also showed better healing than no implant at 6 months postoperatively, the mineral bone was not fully repaired as observed on X-ray images. These results show that the healing period of the mineral bone in the trimmed CHONDROPLUG™ implant group is shorter than without modification. This means that if this trimmed method is applied to implants implanted in patients, the healing period can be shortened. Since previous imaging studies showed that the thickness of knee articular cartilage was about 3 mm, the depth of the trimmed plug was designed and set as 4.5 mm to cover the range of the cartilage, subchondral bone, and a little bit of mineral bone in this study. As expected, it was demonstrated that the cartilage and subchondral bone can still be repaired by the trimmed CHONDROPLUG™ plugs in this study just like the original CHONDROPLUG™ implants. The trimmed CHONDROPLUG™ plugs didn't slip or fall out from the defect sites, and no animals were uncomfortable or disabled after implantation. In contrast, the surface of the defect site in the empty hole group was uneven because of a lack of fillers (See, e.g., FIG. 6), and the calculating bone density was also lower (See, e.g., FIG. 4). However, the cartilage needs to be hydrated, thick and smooth to reduce joint friction 25, but the empty hole group obviously cannot achieve the purpose of reducing articular surface friction with the cartilage layer. In addition, DL-lactide/glycolide copolymer with 85:15 mol ratio is the raw material used in the CHONDROPLUG™ implant, and its complete degradation time in vitro and in vivo at 37° C. is about 6 months. As shown in FIG. 3, the implant gradually shrank at 6 months of observation and became undetectable at 12 months after implantation (See, e.g., FIG. 3 and FIG. 5). It is worth noting that even with the same raw material, the actual degradation time varies slightly for each implant, because the degradation rate is also influenced by the porosity, thickness and contact area of the scaffold structure as well as the water content and pH around the implant site.

The defect sites of the trimmed plug group and the empty hole group were all bright on the CT images at 12 months (See, e.g., FIG. 3), but it could not be ruled out that the bright parts were new bone, blood clot, or implant. Since the imaging technology of CT is through X-ray injection and object absorption, the intensity of the imaging depends on the amount of tissue absorption. In other words, if two substrates have similar absorbed capabilities for X-ray and it is difficult to distinguish the composition of the two substances. Therefore, MRI imaging was also used to assist in judging the composition of the defects. The imaging technique of MR is based on the difference of the nuclear magnetic moments of hydrogen atoms in different molecules, and we can use different sequences to distinguish the main composition of targets. Both the T1W and T2W MR images of the trimmed plug group show bright parts around the defects (See, e.g., FIG. 5), suggesting that the tissue was newborn bone. On the contrary, T1W is bright and T2W is dark in the empty hole group so it is speculated that the defect is filled with adipose tissue (See, e.g., FIG. 5).

From results of the HE, Alcian blue, Safranin O and Movat pentachrome stain, the cartilage layer of the trimmed plug group grew abundant chondrocytes, and the subchondral was well adhered to the mineral bone layer without gaps (See, e.g., FIG. 7 and FIG. 8). In the control group, only fibrosis was developed on the surface of the mineral bone, and there was an obvious inflammation response. Although chondrocytes were found in the regenerated bone tissue, the cell clumps could not be evenly distributed due to the absence of a digestion step. These chondrocytes are unable to form a thick and functional cartilage layer on top of the bone layer. Furthermore, chondrocytes of the control group could not grow in the correct position on the defective surface due to the absence of the implant. Comparing these two groups, it can be proved that the chondrocytes of the regenerated cartilage in the experimental group indeed mainly come from the chondrocytes obtained after the digestion of the cartilage tissue, not from the defect local site or bone marrow. The main reason is that only a few chondrocytes remained on the defect surface in the control group, probably adhered to during the defect manufacturing operation.

The main component of native knee articular cartilage is hyaline cartilage. Due to its high-water content and good elasticity, hyaline cartilage has the ability to cushion and reduce friction. However, only fibrocartilage is produced when damaged cartilage regenerates, not hyaline cartilage. Fibrocartilage is a tough, dense, and fibrous material, and it forms a scar in the original cartilage area when hyaline cartilage is torn. Although a scar can protect the affected part to prevent harmful bacteria from invading, it cannot provide elasticity and functionality like the hyaline cartilage for knee joints. Therefore, fibrocartilage and scar are not ideal tissue for knee cartilage. Collagen II is mainly a marker of hyaline cartilage, and collagen I is a marker for fibrocartilage. From the IHC results in FIG. 9, the protein expression of collagen II was high in the trimmed plug group, and that of collagen I was extremely low, indicating that the main component of the regenerated cartilage was hyaline cartilage, which was the same as the natural knee articular cartilage. ACI and microfracture, the two commonly used repair methods in clinics, mainly generate fibrocartilage after healing, and the CHONDROPLUG™ method can effectively generate hyaline cartilage, which is better in comparison.

In the results of the compression test, the strength of regenerated tissues after 12 months was similar to that of natural knee joints (See, e.g., FIG. 10). When the displacement is less than 6 mm, the load force-displacement and stress-stain curves of each group were similar. However, when the displacement was greater than 6 mm (strain>0.2), the maximum load force and ultimate stress in the trimmed plug group were better than those in the control group, even better than that in the native porcine femoral condyle group. Since a better and thicker hyaline cartilage layer was regenerated after CHONDROPLUG™ implantation (FIG. 9), the loading force is better absorbed when the loading force was greater. It is speculated that the max load force and ultimate stress in the native porcine femoral condyle group were slightly weaker due to the cartilages wear and tear without opportunity to regenerate during the breeding.

In some embodiments, trimmed CHONDROPLUG™ implants are considered to combine the advantages of mosaicplasty, ACI, and original CHONDROPLUG™ implants with less damage to the mineral bone and a shorter recovery period. The main component of the regenerated cartilage by the trimmed CHONDROPLUG™ implants was hyaline cartilage, which has the same cushioning and friction-reducing capabilities as natural knee cartilage.

Of note, the exemplar embodiments of the disclosure described herein do not limit the scope of the invention since these embodiments can be merely examples of the embodiments of the invention. Any equivalent embodiments can be intended to be within the scope of this invention. Indeed, various modifications of the disclosure, in addition to those shown and described herein, such as alternative useful combinations of the elements described, may become apparent to those skilled in the art from the description. Such modifications and embodiments can be also intended to fall within the scope of the appended claims.

What is claimed is:

1. A transplantable implant comprising:
   a biocompatible scaffold configured to be degraded over time when implanted to cartilage of a patient, the biocompatible scaffold comprising a first phase having a first plurality of pores and a second phase having a second plurality of pores, wherein the first phase has higher porosity than the second phase;
   a plurality of chondrocytes in the first phase,
      wherein the implant has a full longitudinal length to be implanted to an implantation hole created on the cartilage, wherein the implantation hole has an implantation depth, wherein the implant along the full longitudinal length has a first longitudinal length corresponding to the first phase and the cartilage portion in the implantation hole along the implantation depth and a second longitudinal length corresponding to the second phase and a mineral bone portion in the implantation hole along the implantation depth when the implant is implanted to the implantation hole, wherein the ratio of the first longitudinal length of the first phase to the full longitudinal length of the implant is from 0.35 about 0.6 to about 0.9, and
      wherein the first phase includes more collagen II than the second phase six months after the biocompatible scaffold degrades over time in the implantation hole.

2. The transplantable implant of claim 1, wherein the ratio of the first longitudinal length to the full longitudinal length is from 0.6 to 0.9.

3. The transplantable implant of claim 1, wherein the ratio of the first longitudinal length to the full longitudinal length is from 0.65 to 0.9.

4. The transplantable implant of claim 1, wherein the ratio of the first longitudinal length to the full longitudinal length is from 0.66 to 0.9.

5. The transplantable implant of claim 1, wherein the ratio of the first longitudinal length to the full longitudinal length is from about 0.6 to about 0.95.

6. The transplantable implant of claim 1, wherein the ratio of the first longitudinal length to the full longitudinal length is from about 0.8 to about 0.9.

7. The transplantable implant of claim 1, wherein the ratio of the first longitudinal length to the full longitudinal length is from about 0.6 to about 0.8.

8. The transplantable implant of claim 1, wherein the full longitudinal length is about 12 mm or less.

9. The transplantable implant of claim 8, wherein the full longitudinal length is about 9.0 mm or less.

10. The transplantable implant of claim 8, wherein the full longitudinal length is about 8.0 mm or less.

11. The transplantable implant of claim 8, wherein the full longitudinal length is about 6.0 mm or less.

12. The transplantable implant of claim 8, wherein the full longitudinal length is about 5.5 mm or less.

13. The transplantable implant of claim 8, wherein the full longitudinal length is about 5.0 mm or less.

14. The transplantable implant of claim 8, wherein the full longitudinal length is about 4.8 mm or less.

15. The transplantable implant of claim 8, wherein the full longitudinal length is about 4.7 mm or less.

16. The transplantable implant of claim 8, wherein the full longitudinal length is about 4.6 mm or less.

17. The transplantable implant of claim 8, wherein the full longitudinal length is about 4.5 mm or less.

18. The transplantable implant of claim 1, wherein the biocompatible scaffold has the full longitudinal length longer than a cartilage thickness of the cartilage.

19. The transplantable implant of claim 1, wherein the biocompatible scaffold has at least about 60% porosity.

20. The transplantable implant of claim 1, wherein the biocompatible scaffold has at least about 65% porosity.

21. The transplantable implant of claim 1, wherein the biocompatible scaffold has at least about 75% porosity.

22. The transplantable implant of claim 1, wherein an average size of the plurality of pores is from about 100 μm to about 700 μm.

23. The transplantable implant of claim 1, wherein an average size of the plurality of pores is from about 225 μm to about 450 μm.

24. The transplantable implant of claim 1, wherein the plurality of chondrocytes includes a plurality of autologous chondrocytes.

25. The transplantable implant of claim 1, wherein the biocompatible scaffold includes poly-L-lactic-co-glycolic acid (PLGA).

26. The transplantable implant of claim 1, wherein the biocompatible scaffold includes tricalcium phosphate (TCP).

* * * * *